Sept. 11, 1934.    A. R. SCHOLIN    1,973,154
TAG STRINGING MACHINE
Filed Nov. 9, 1931    25 Sheets-Sheet 2
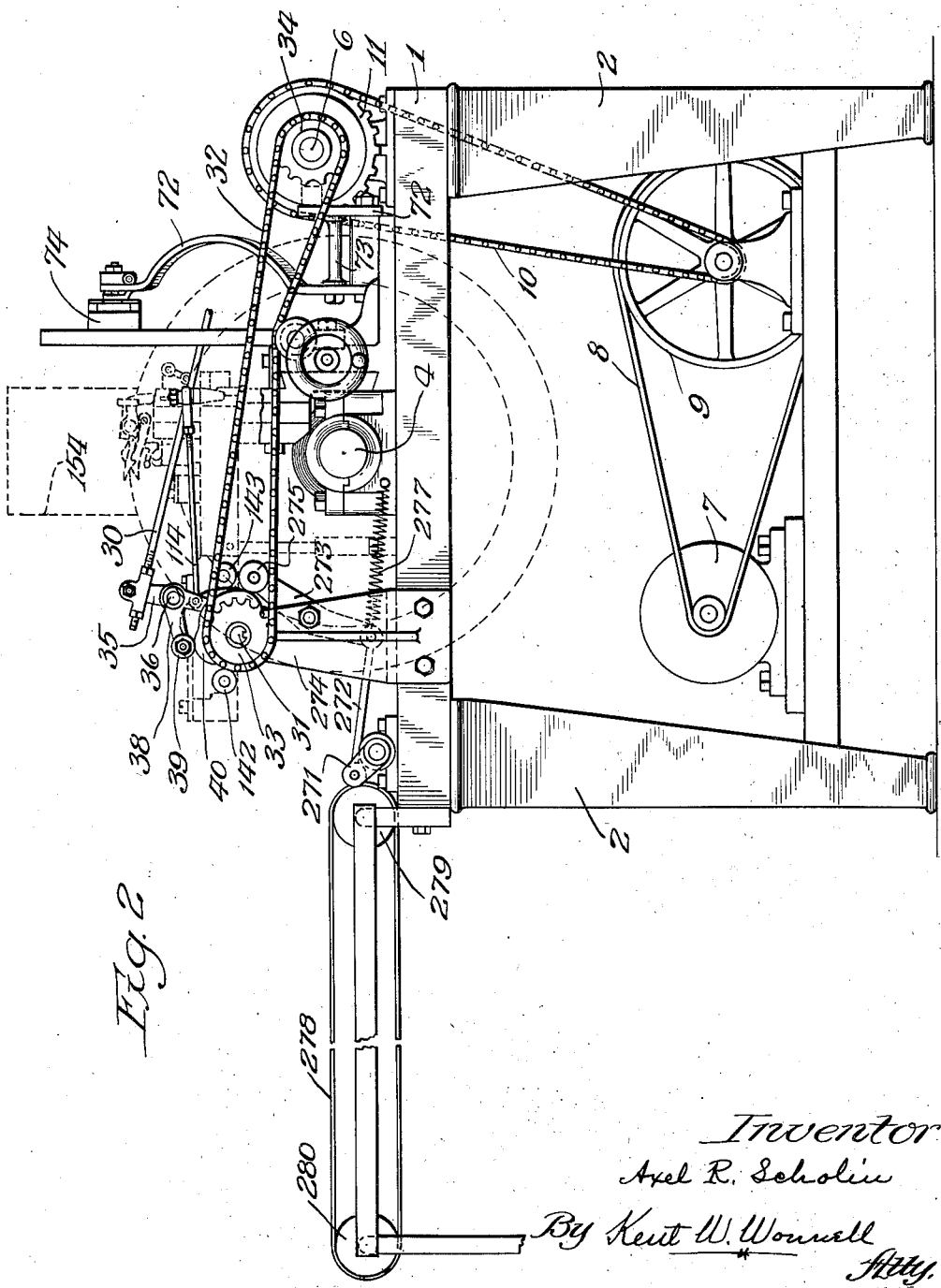
Inventor
Axel R. Scholin
By Kent W. Worrell
Atty.

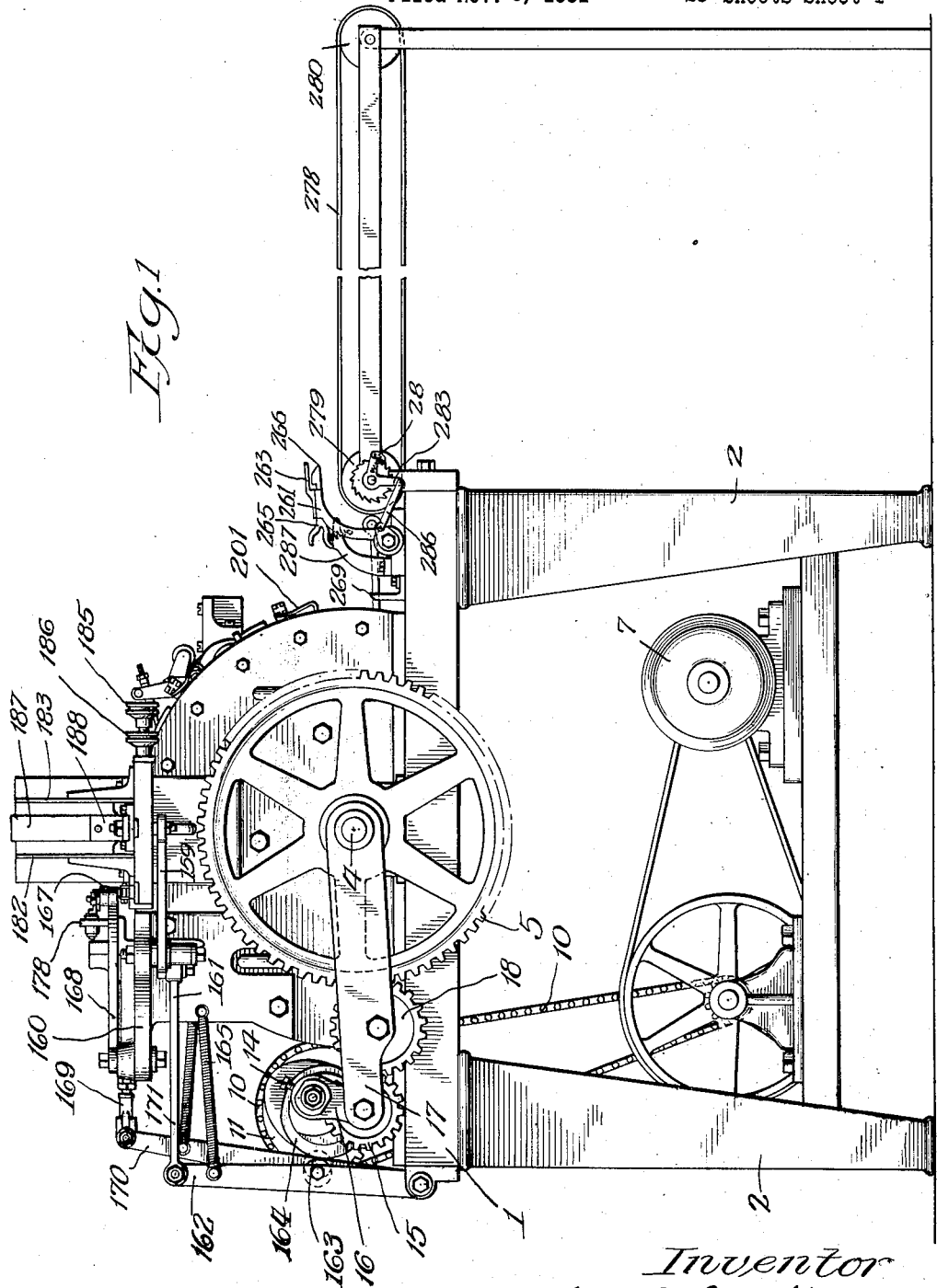

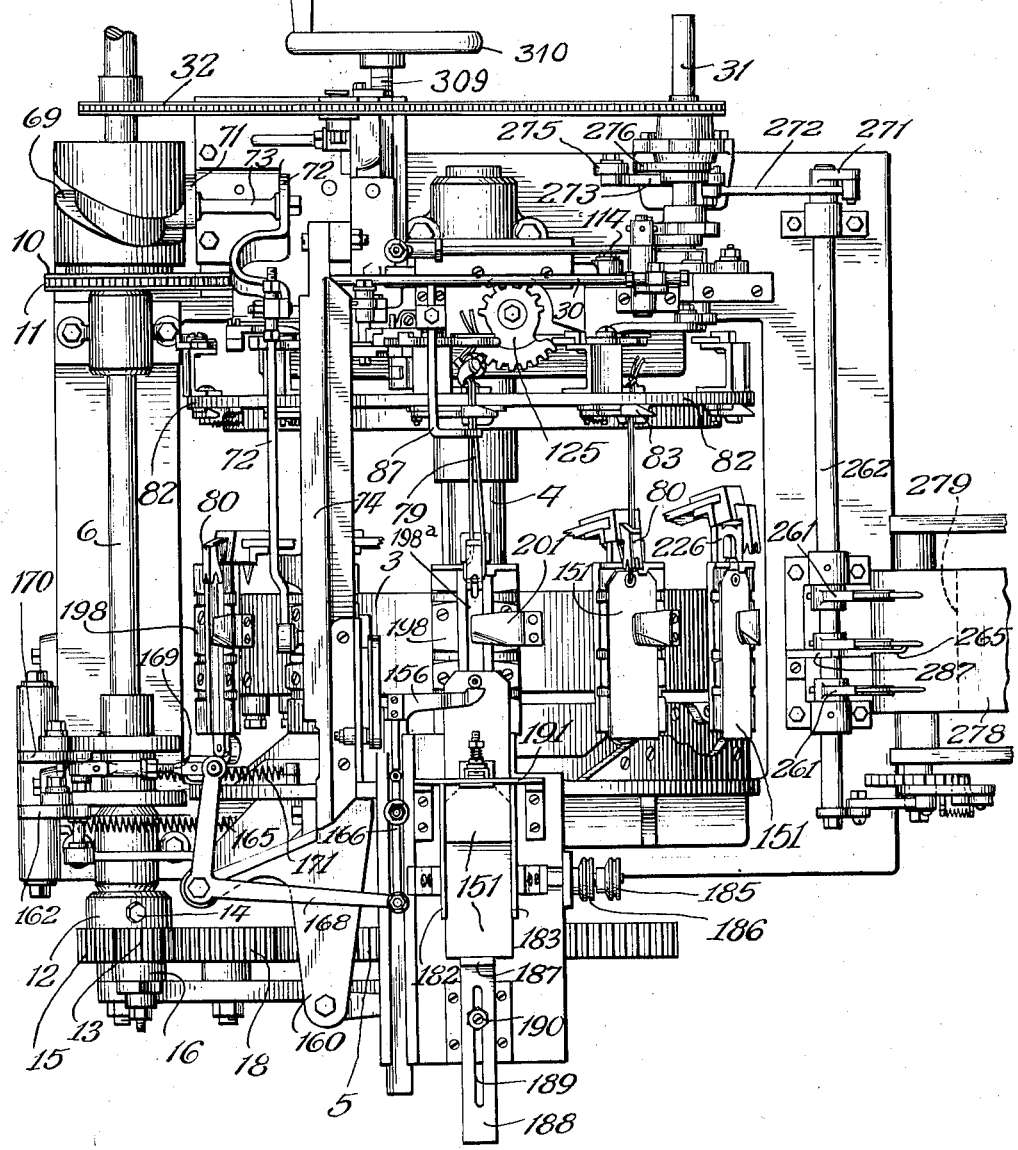

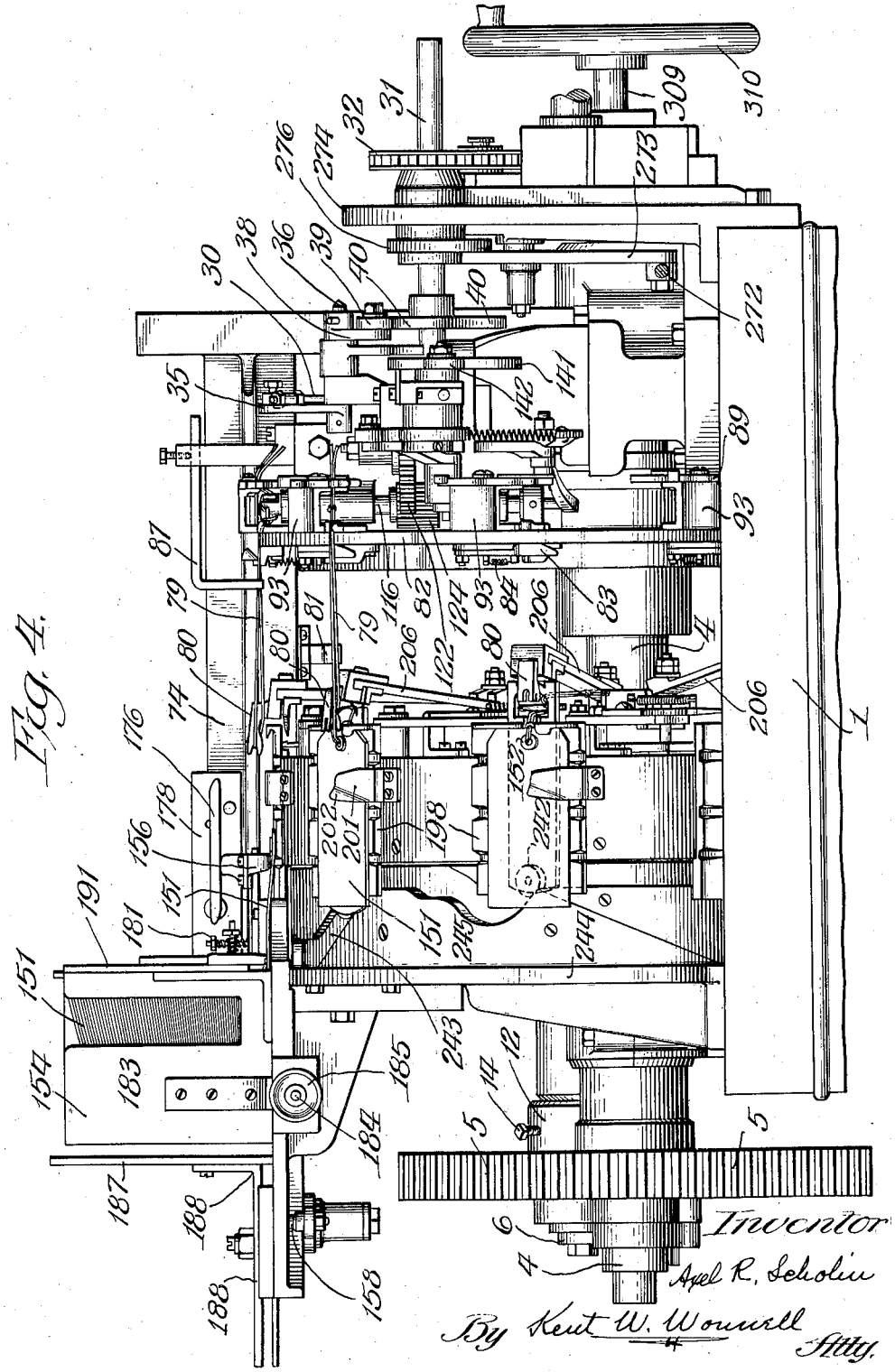

Sept. 11, 1934. A. R. SCHOLIN 1,973,154
TAG STRINGING MACHINE
Filed Nov. 9, 1931 25 Sheets-Sheet 5
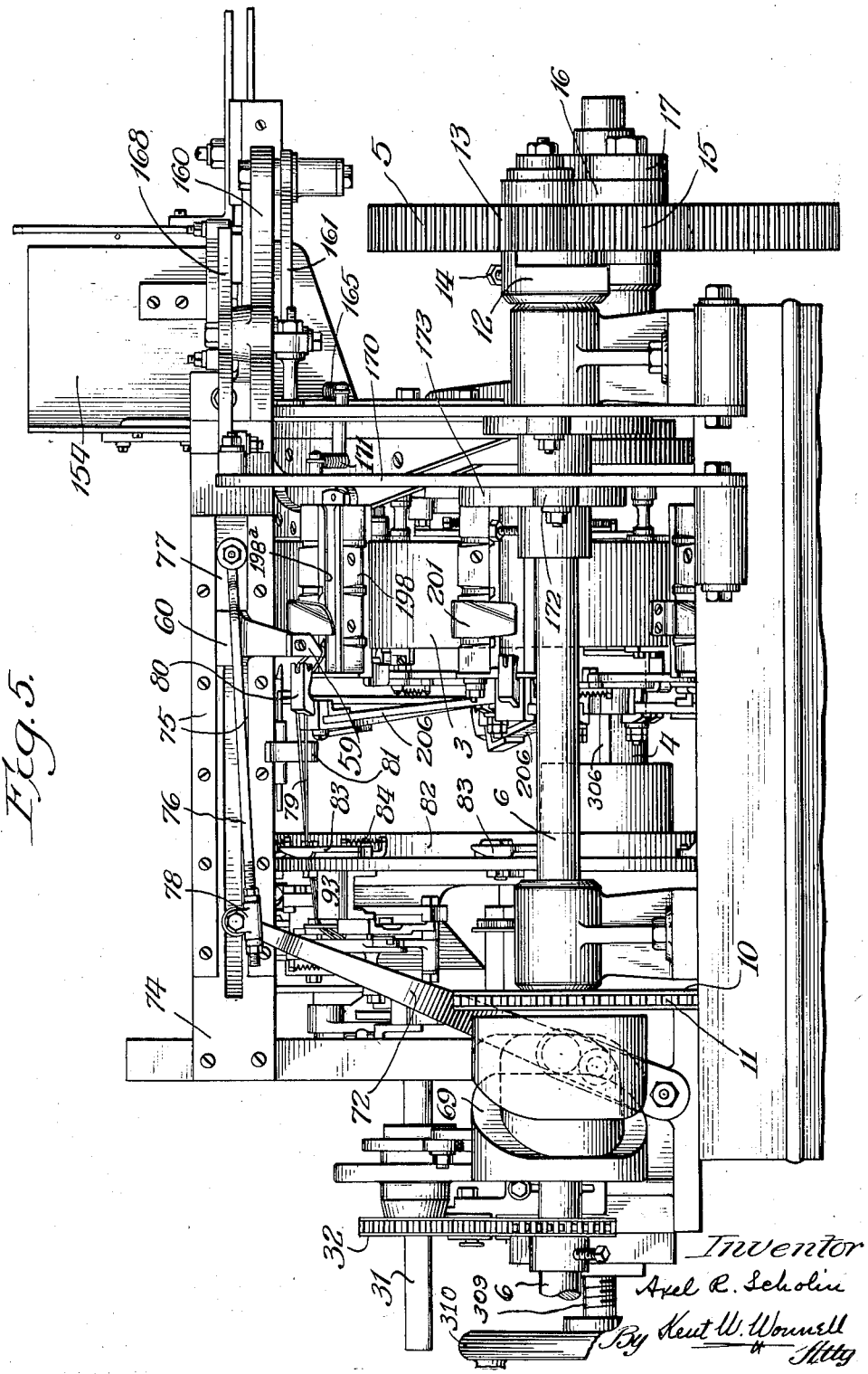

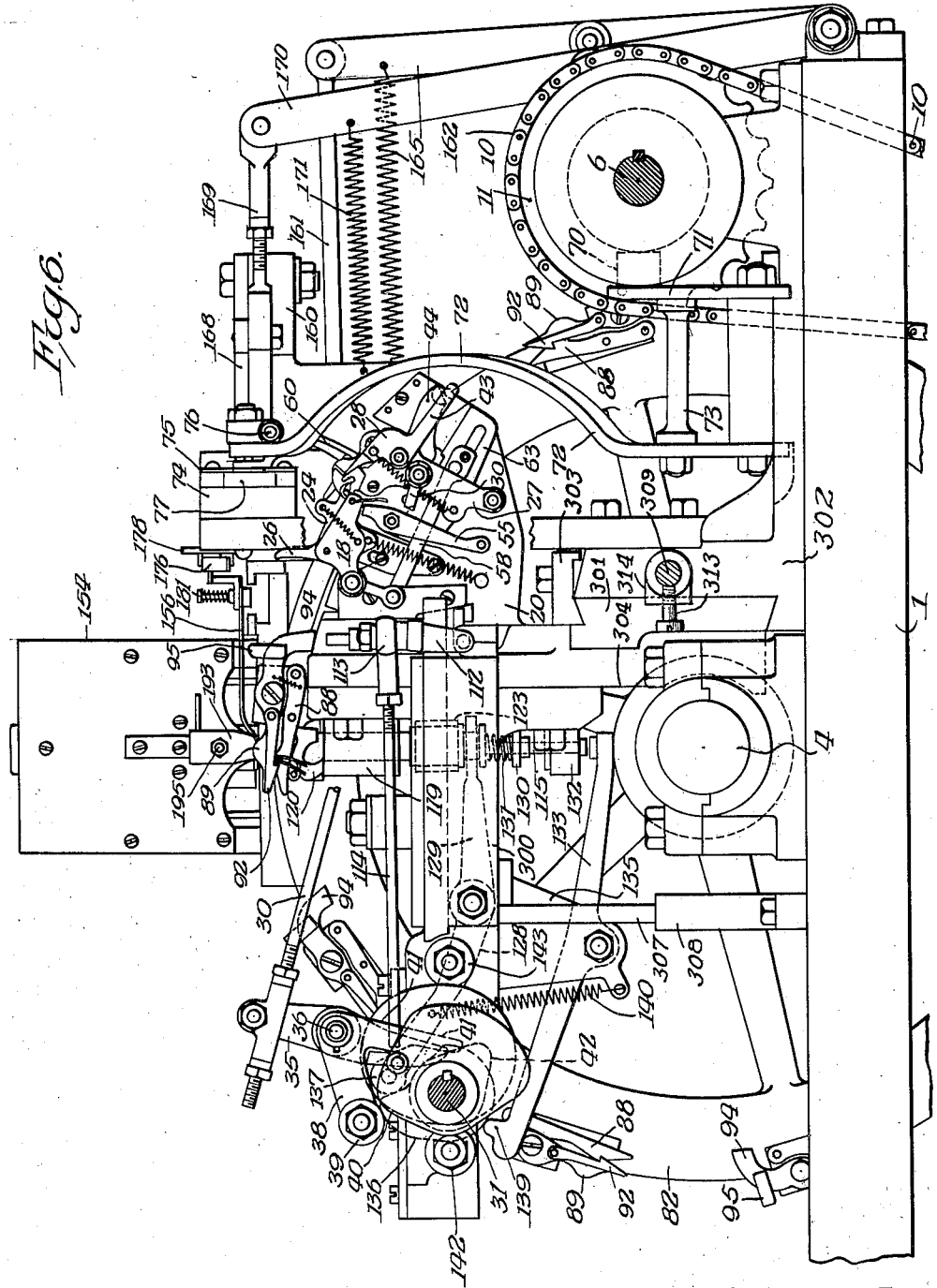

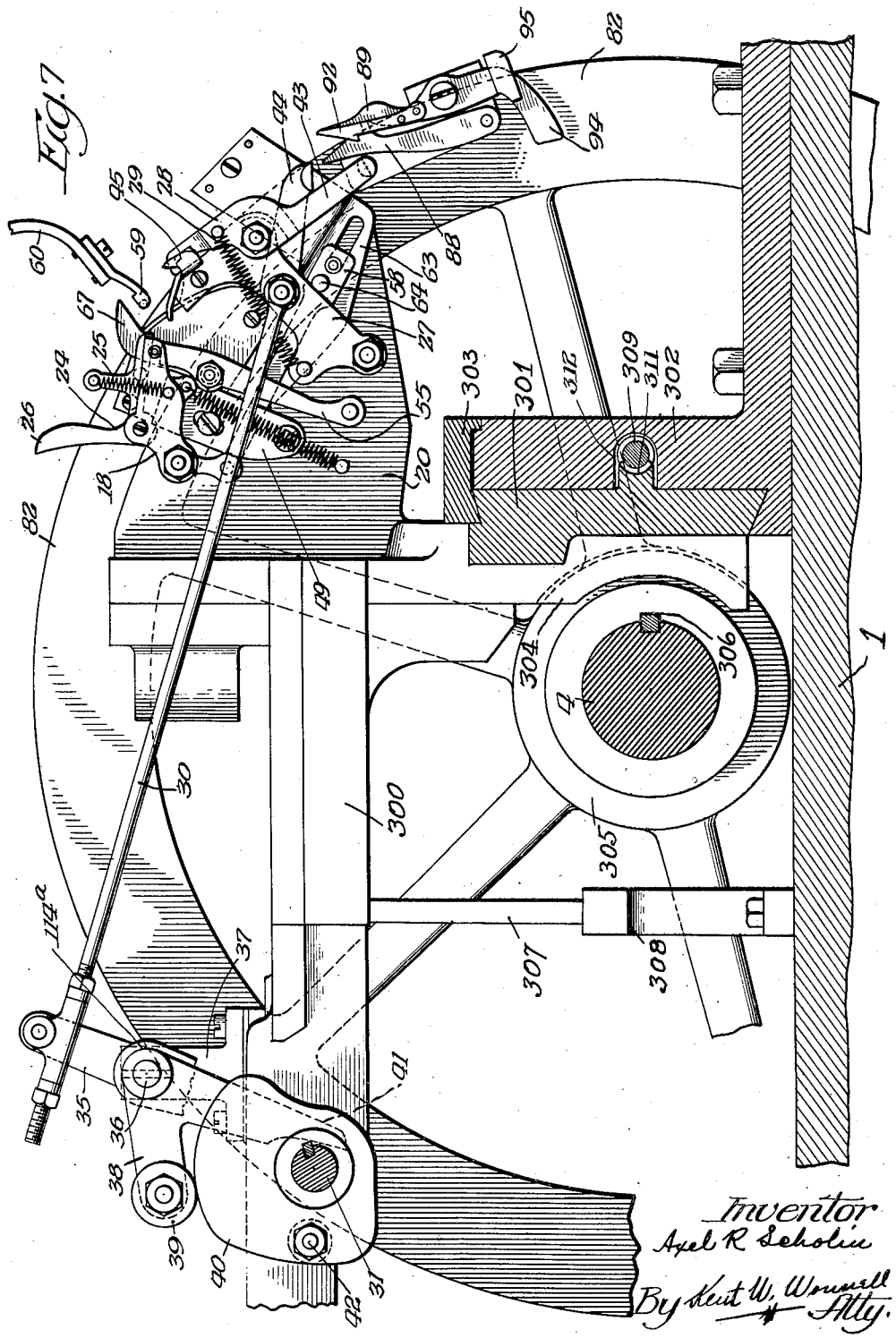

Sept. 11, 1934.　　　A. R. SCHOLIN　　　1,973,154
TAG STRINGING MACHINE
Filed Nov. 9, 1931　　　25 Sheets-Sheet 8
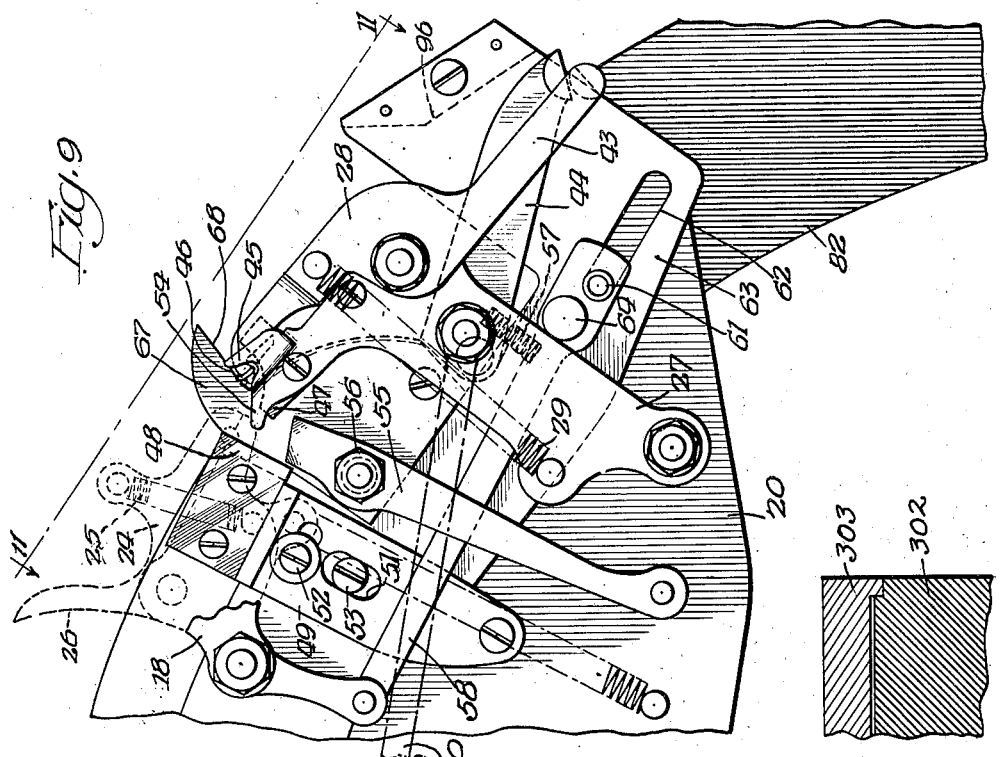
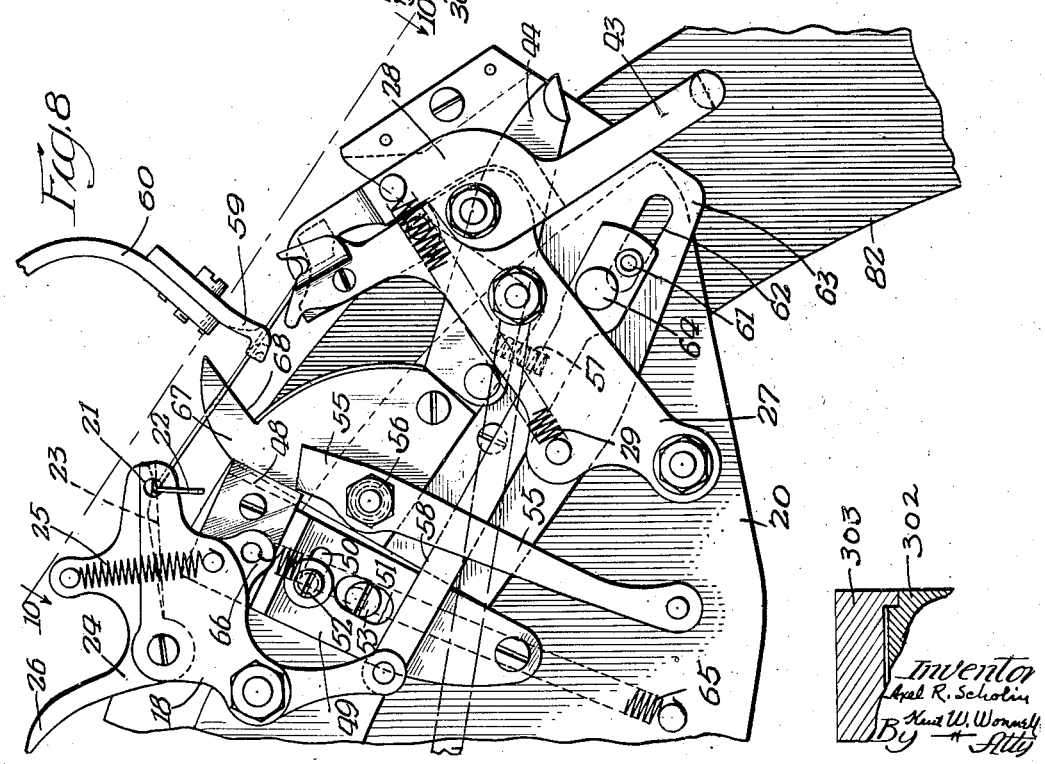

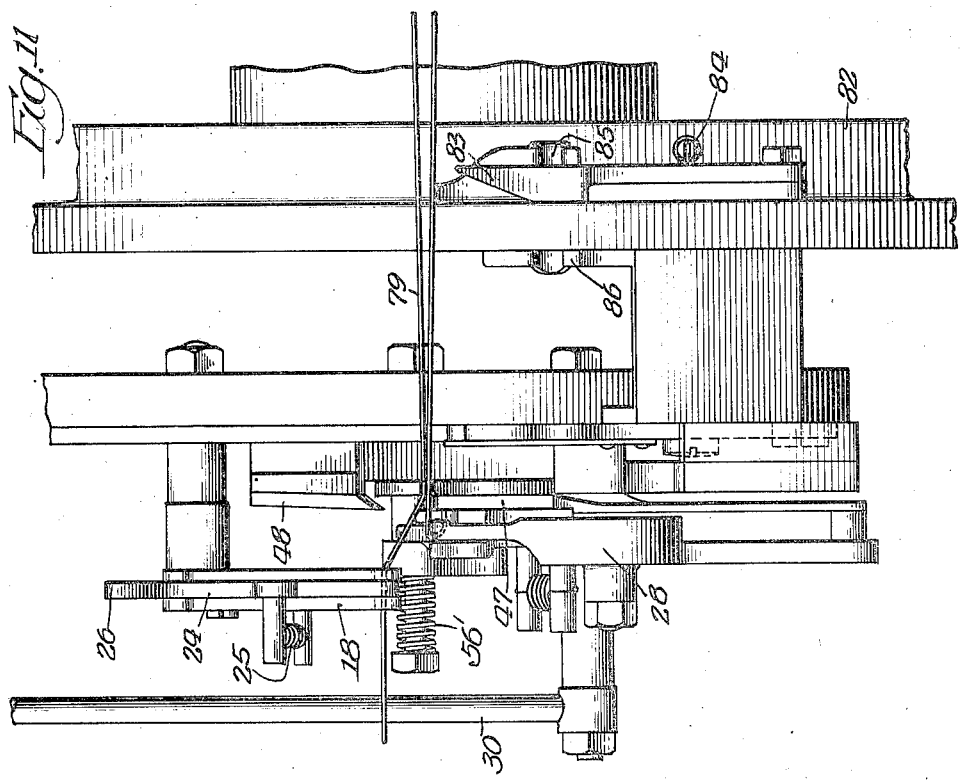
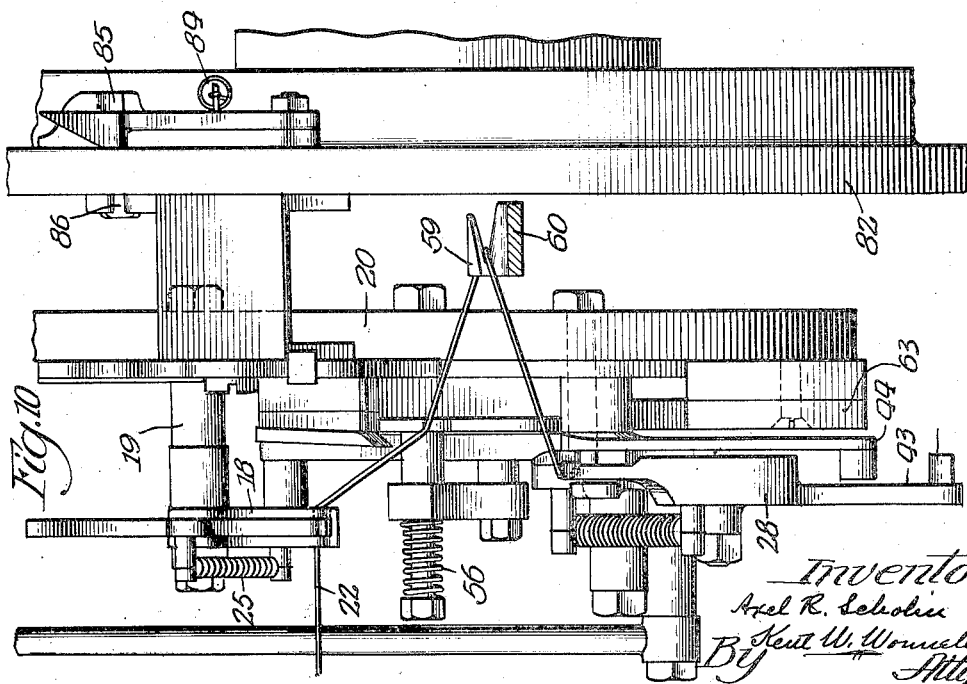

Sept. 11, 1934.   A. R. SCHOLIN   1,973,154
TAG STRINGING MACHINE
Filed Nov. 9, 1931   25 Sheets-Sheet 10
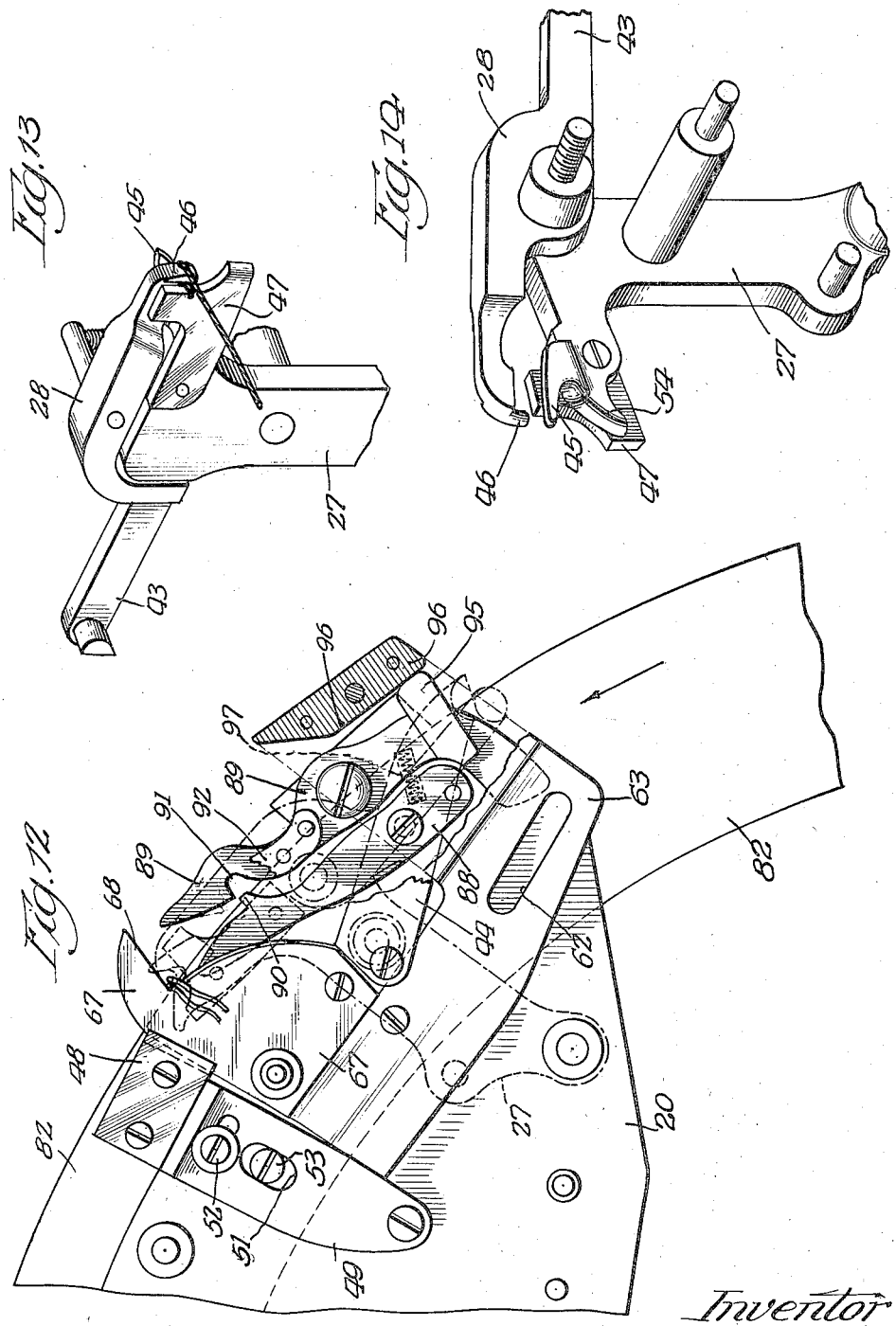
Inventor
Axel R. Scholin
By Kent W. Wonnell Atty.

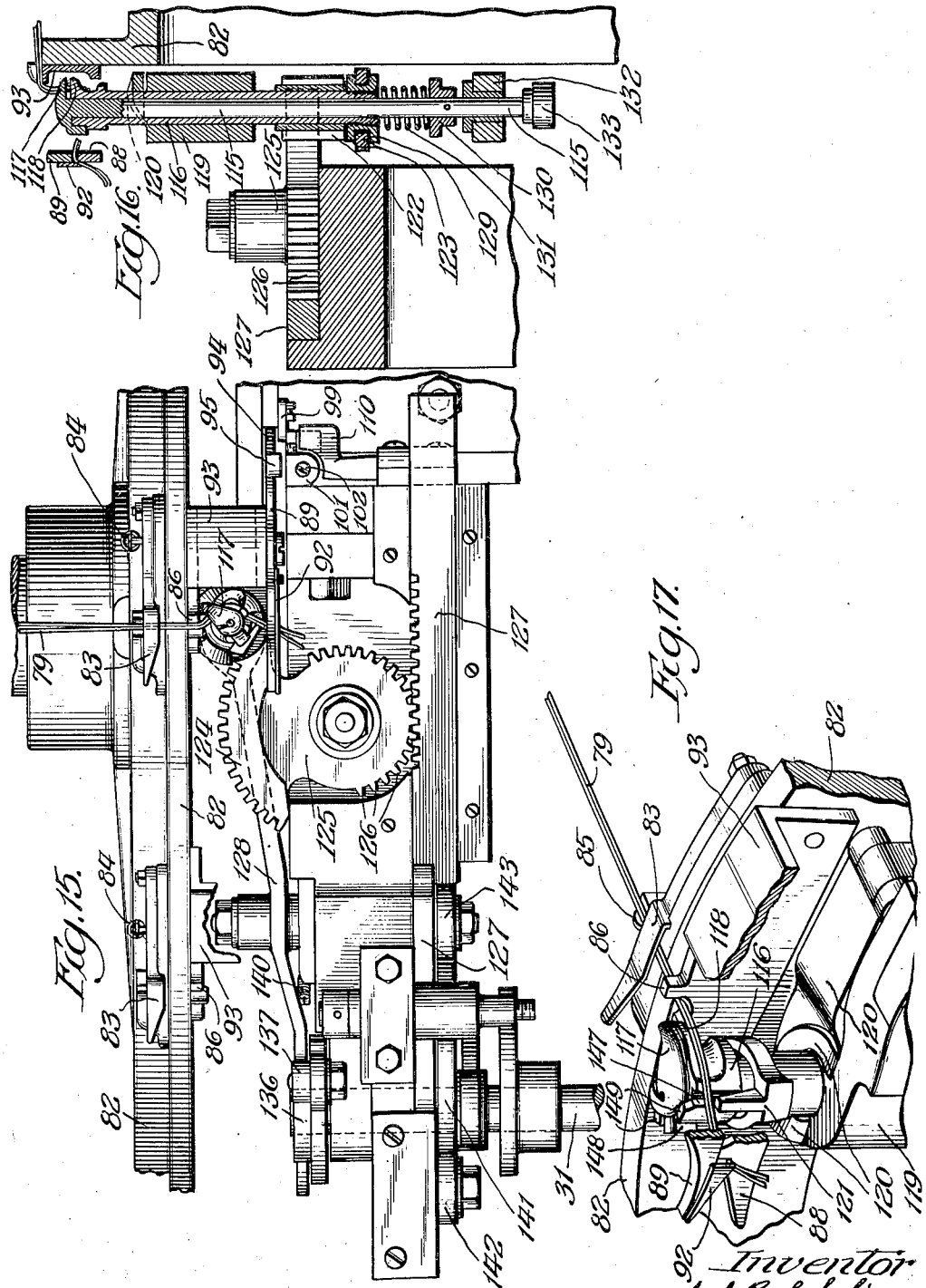

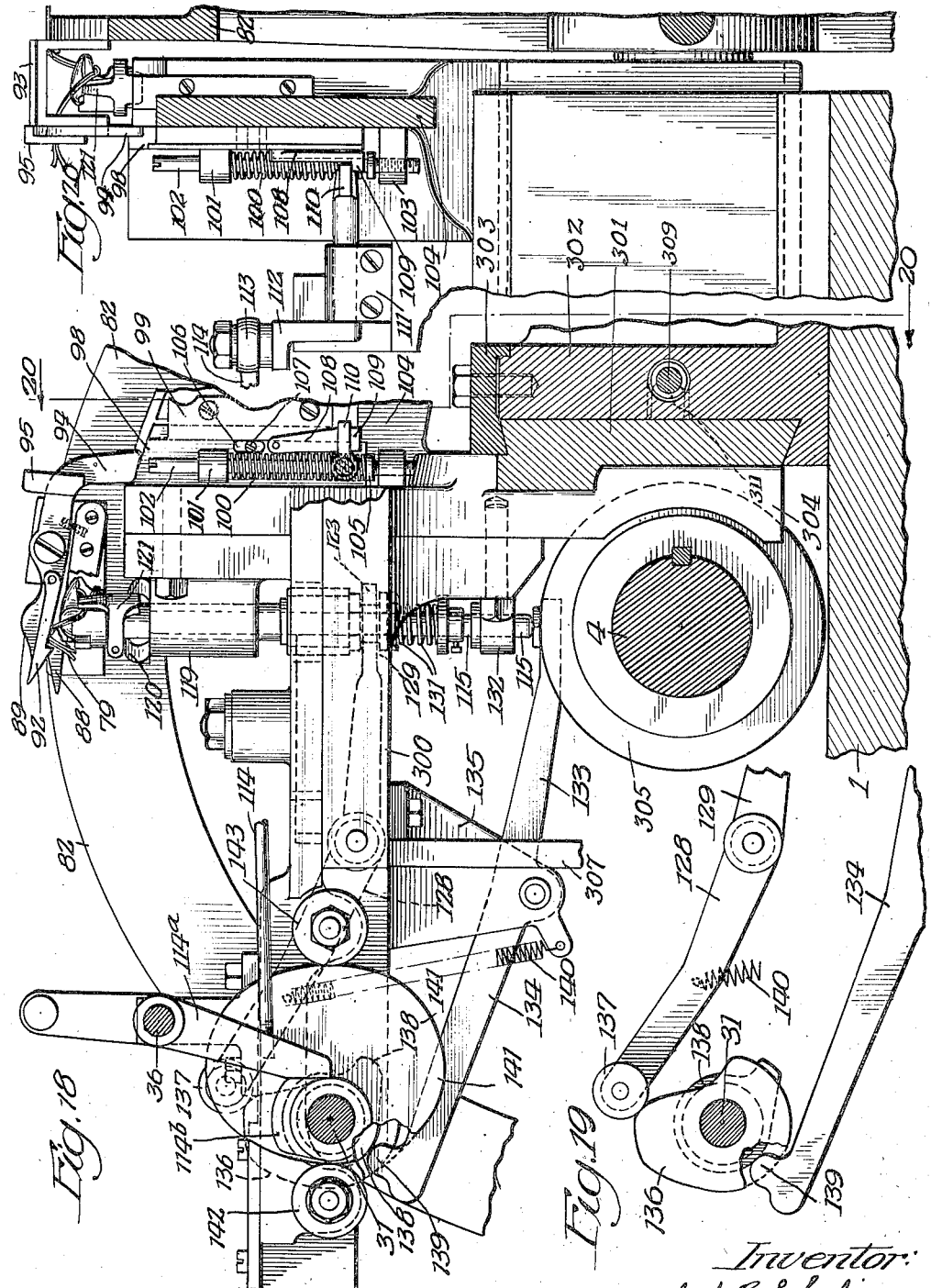

Sept. 11, 1934.  A. R. SCHOLIN  1,973,154
TAG STRINGING MACHINE
Filed Nov. 9, 1931   25 Sheets-Sheet 13
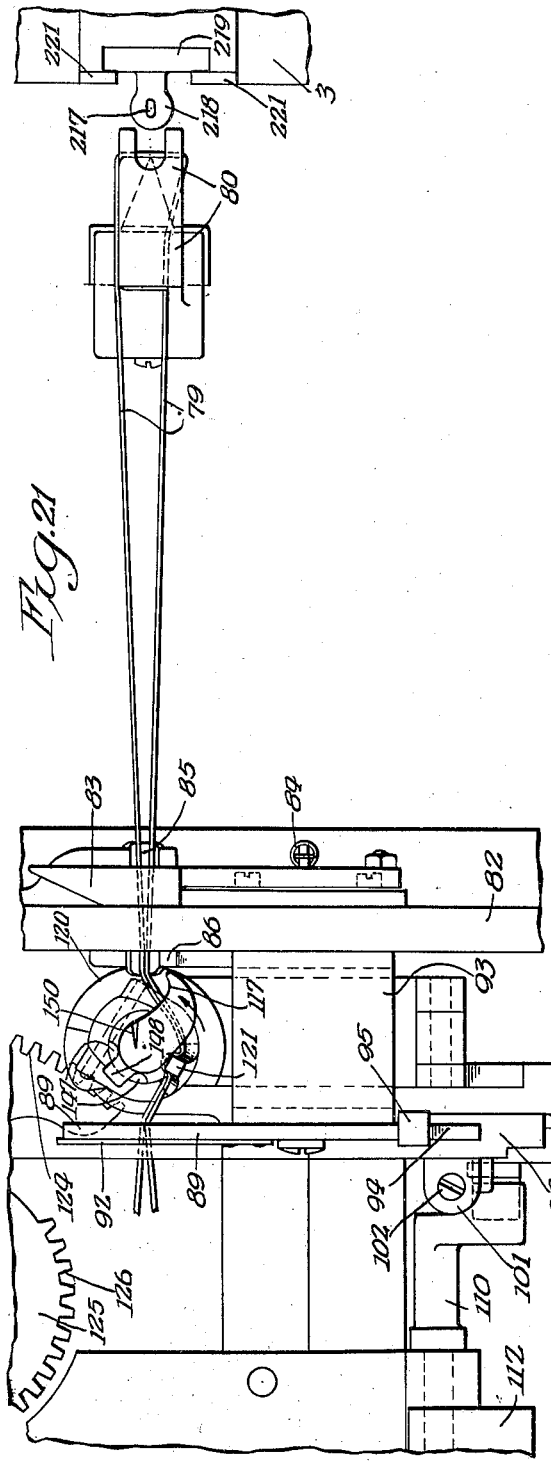
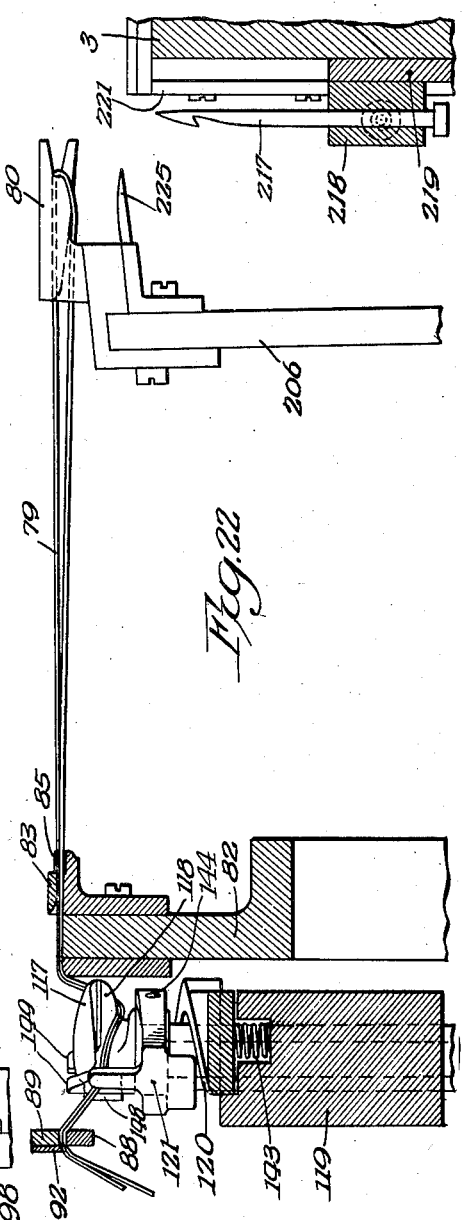
Inventor
Axel R. Scholin
By Kent W. Younnell
Atty.

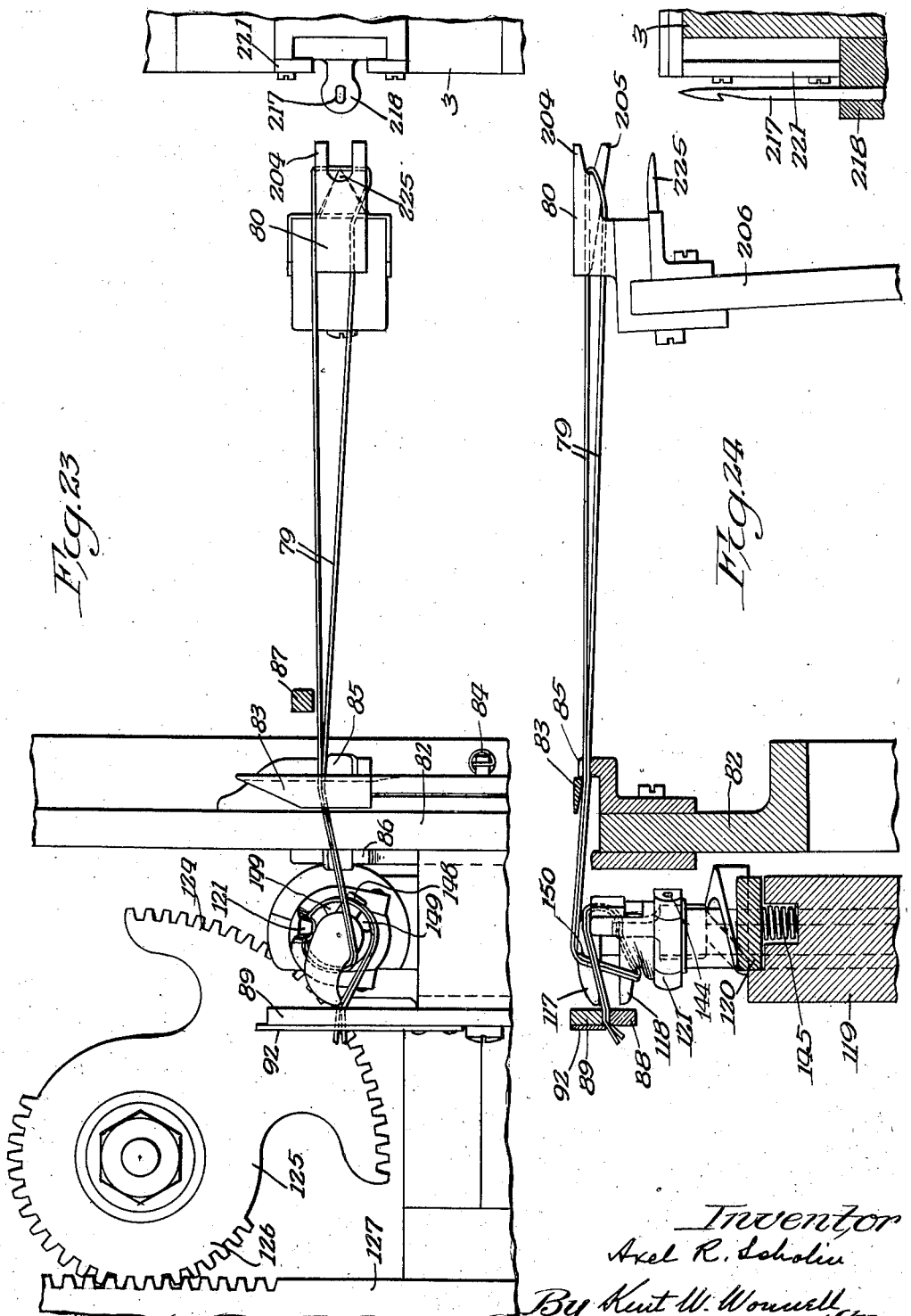

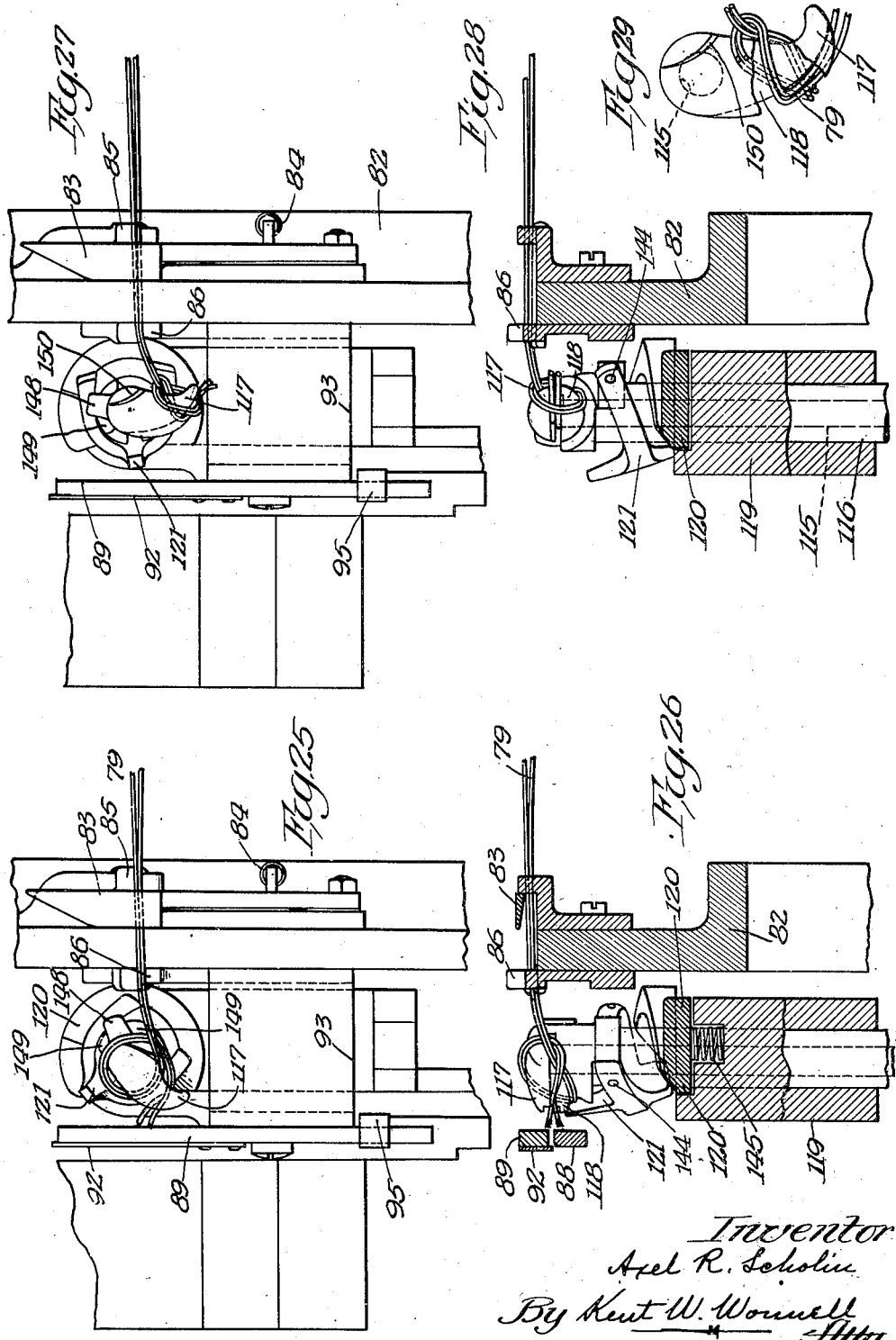

Sept. 11, 1934.  A. R. SCHOLIN  1,973,154
TAG STRINGING MACHINE
Filed Nov. 9, 1931   25 Sheets-Sheet 16
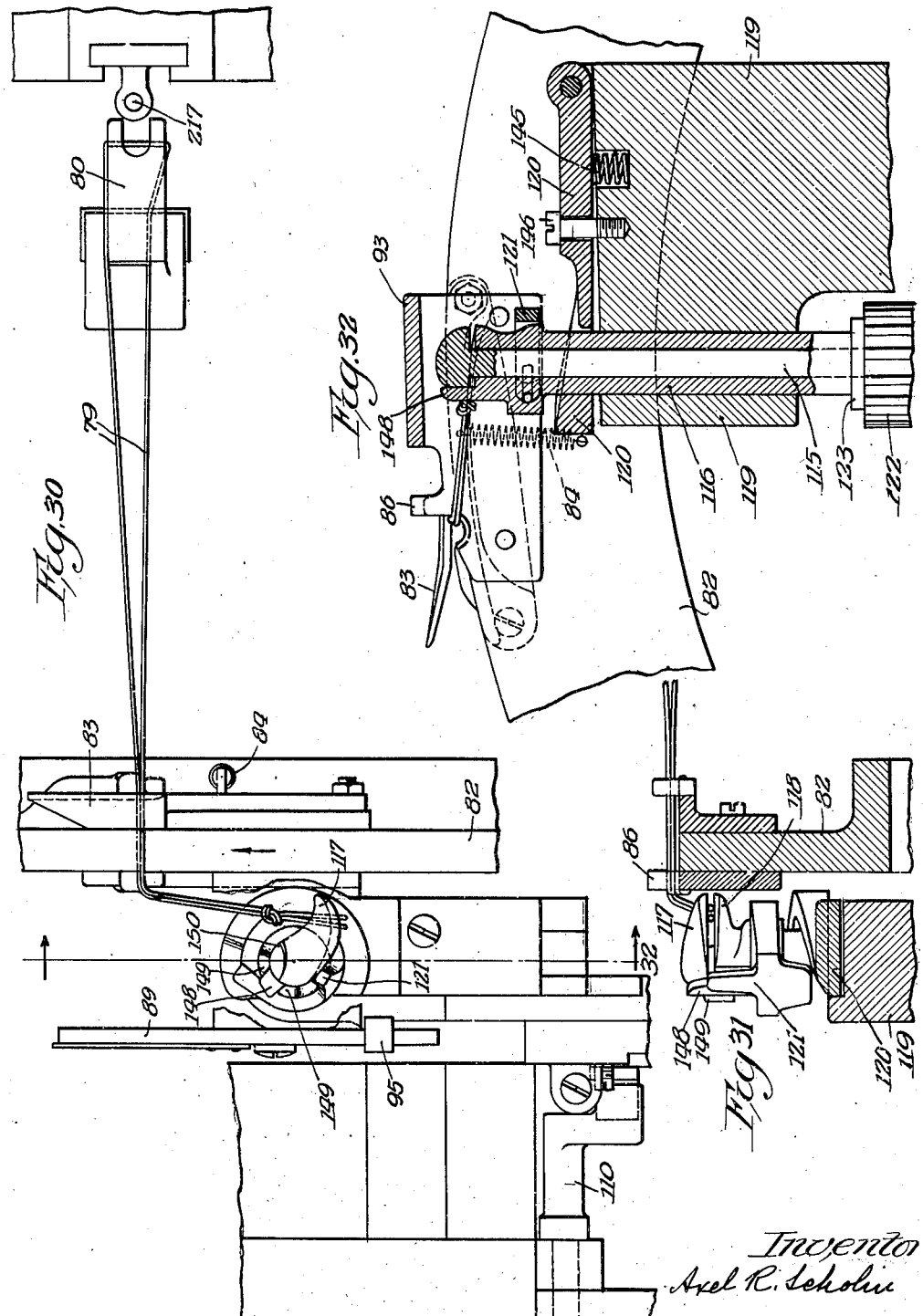
Inventor
Axel R. Scholin
By Kent W. Wonnell Atty.

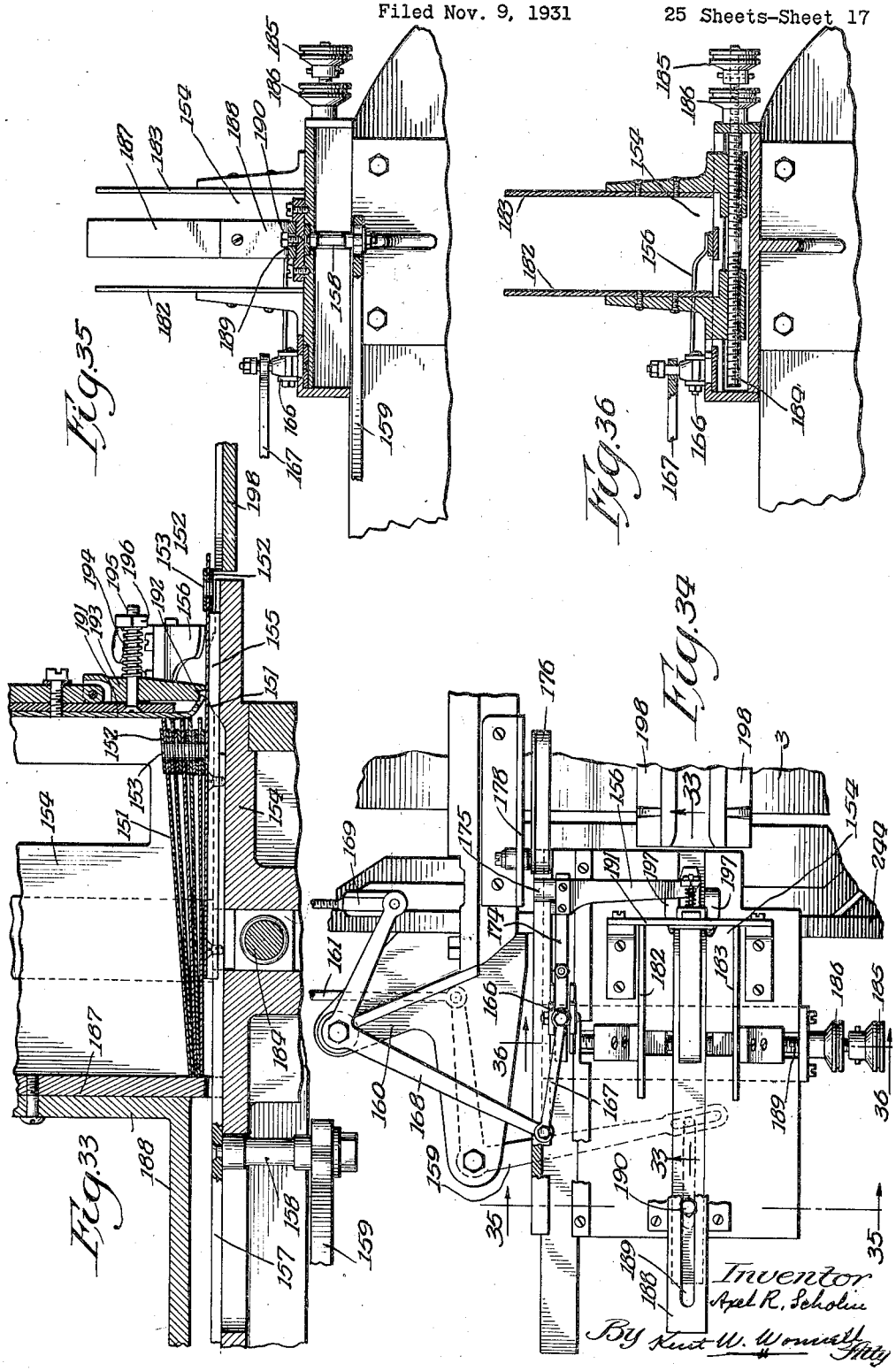

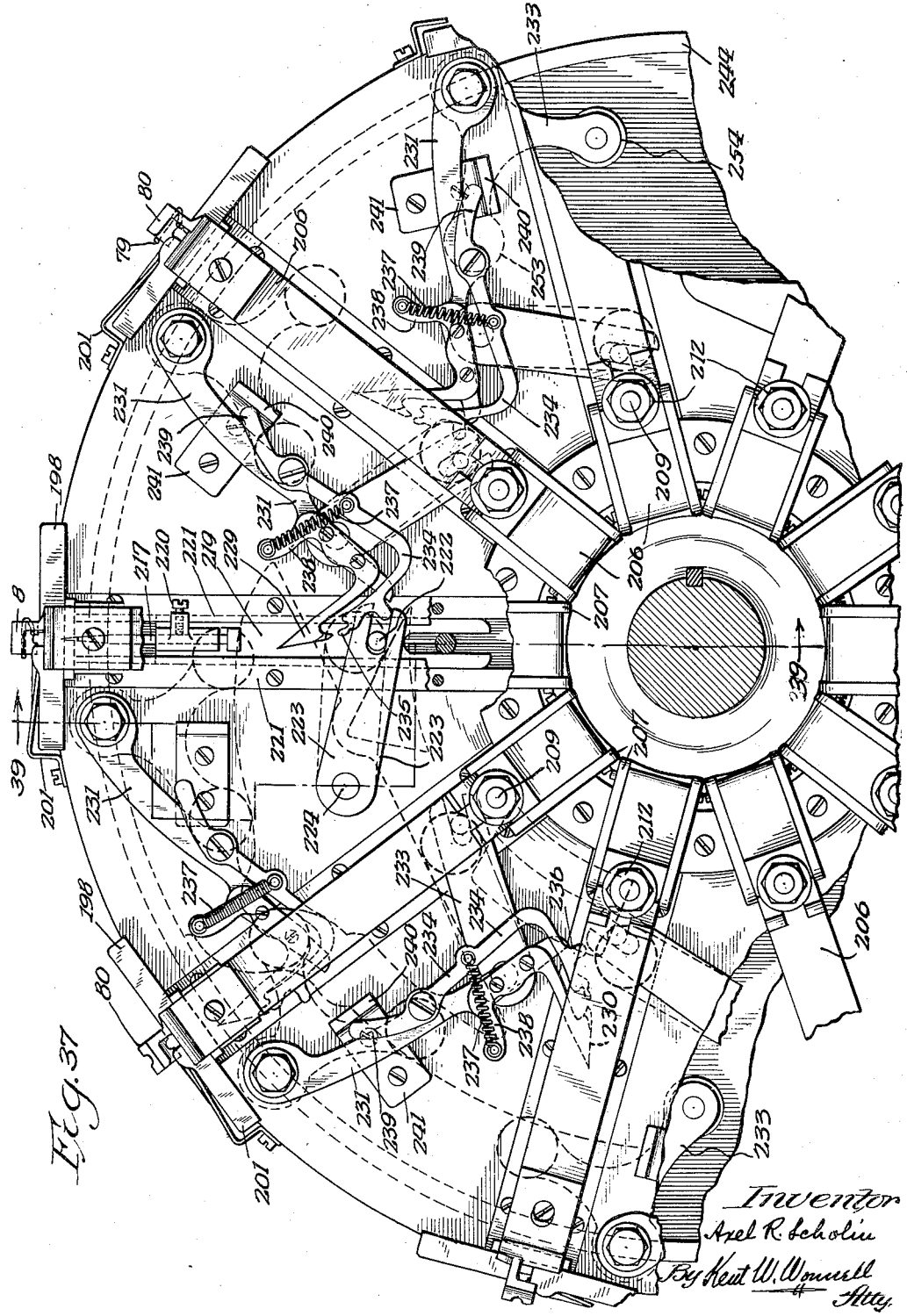

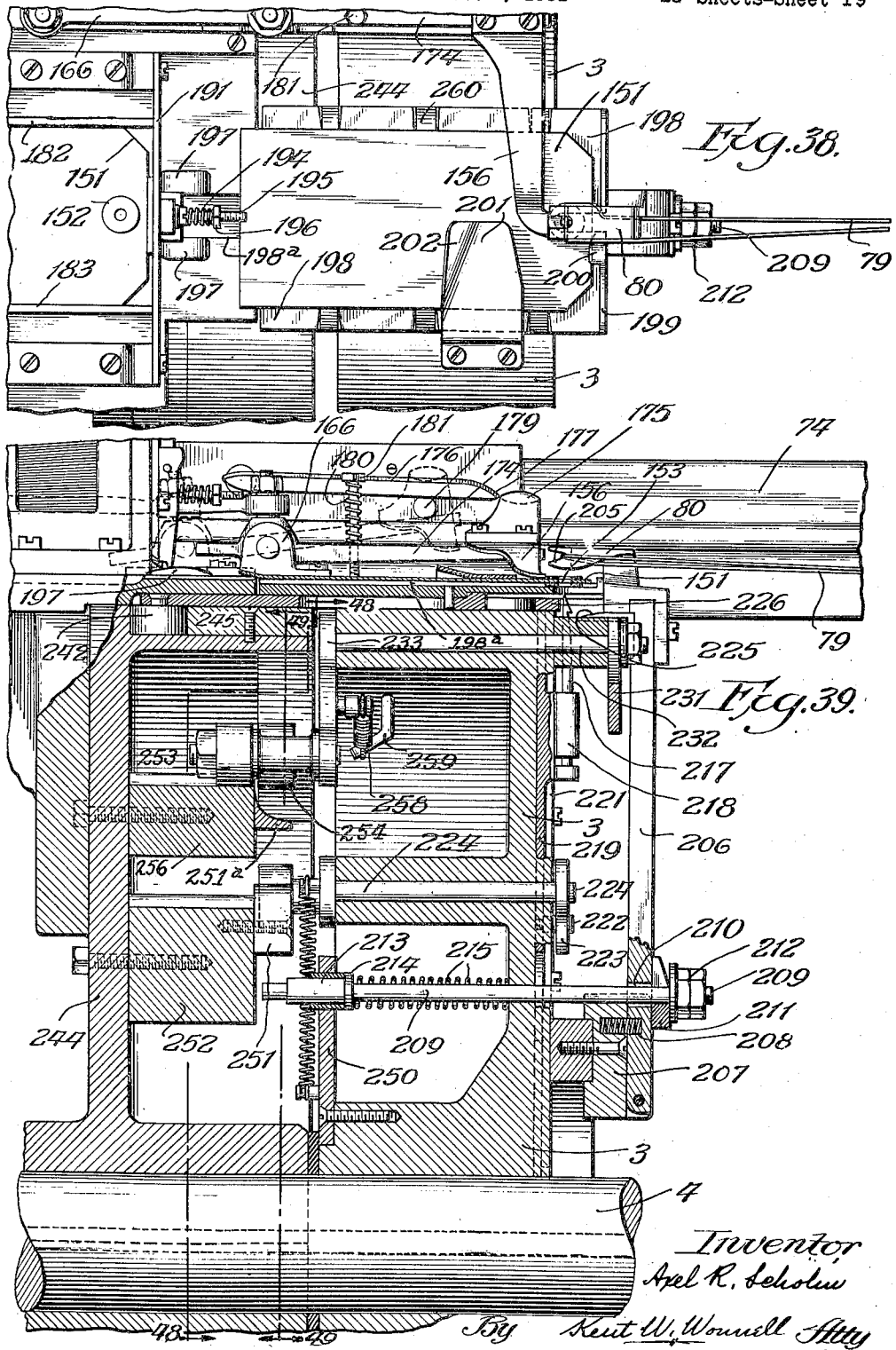

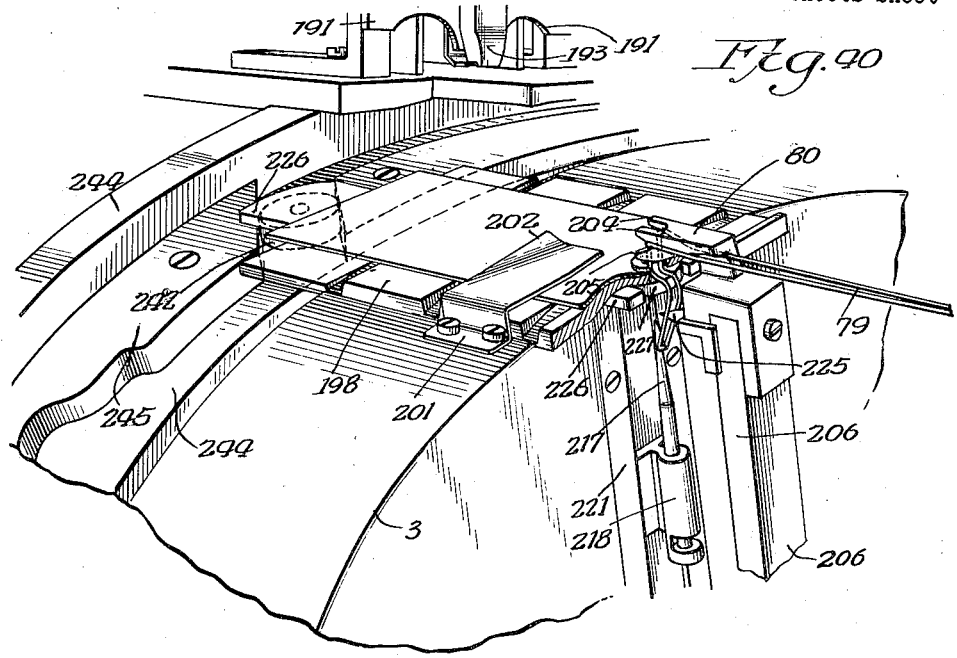
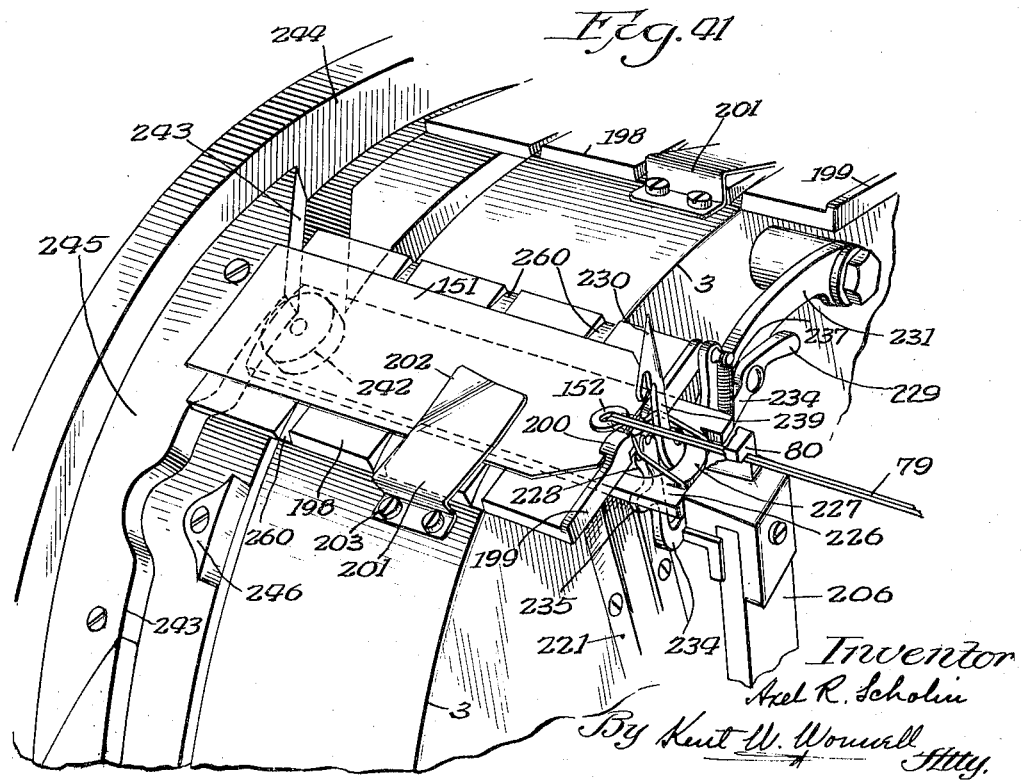

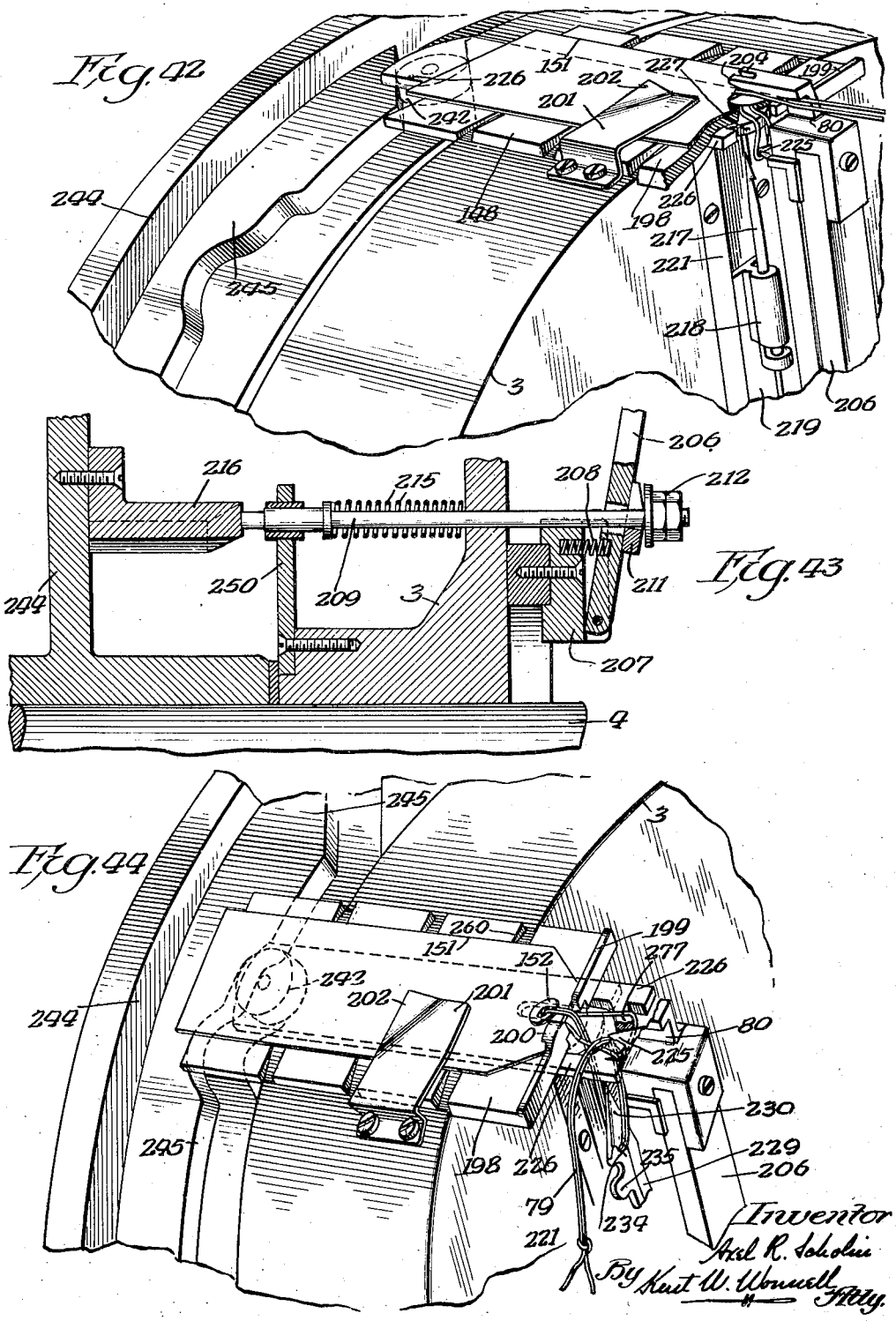

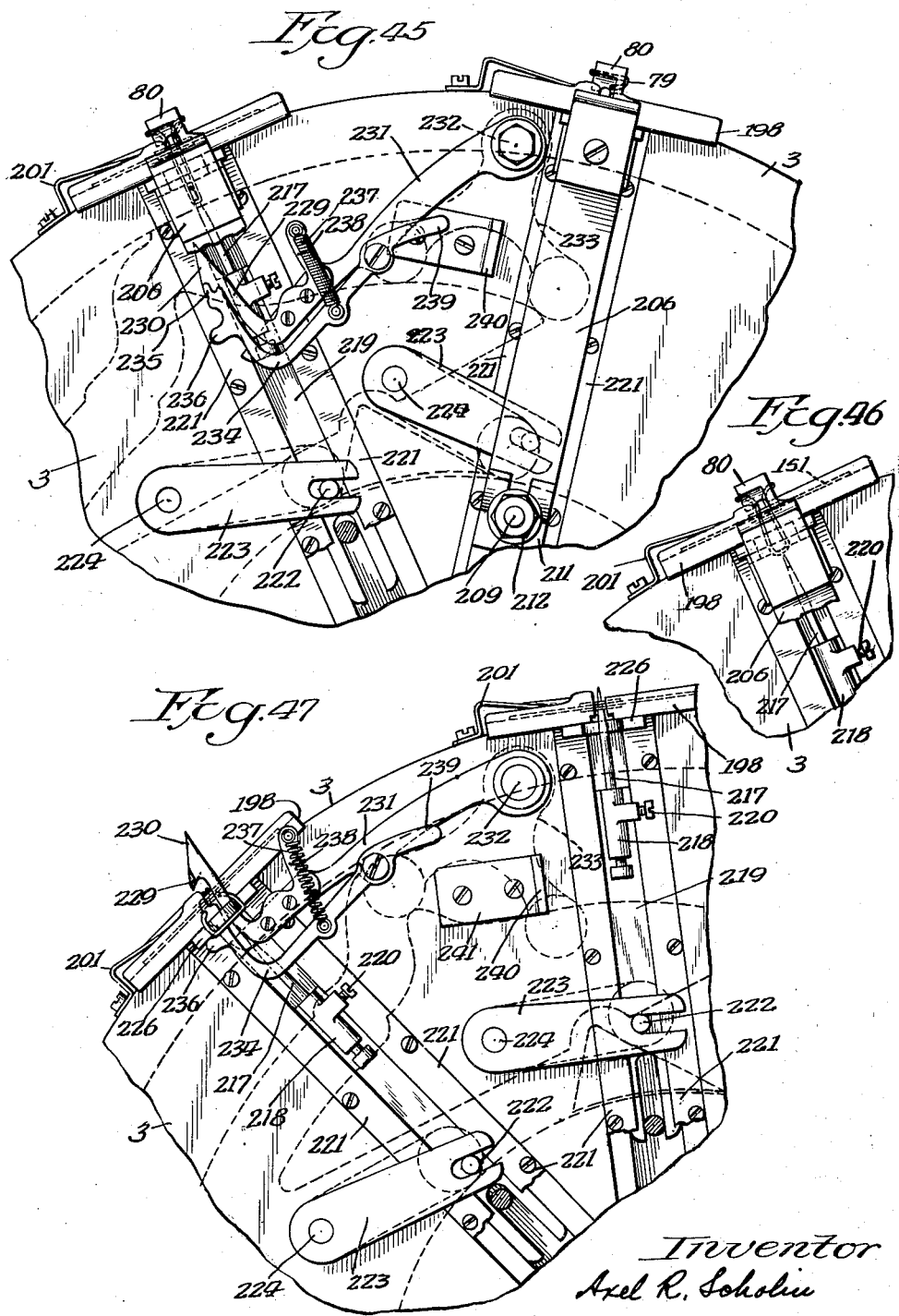

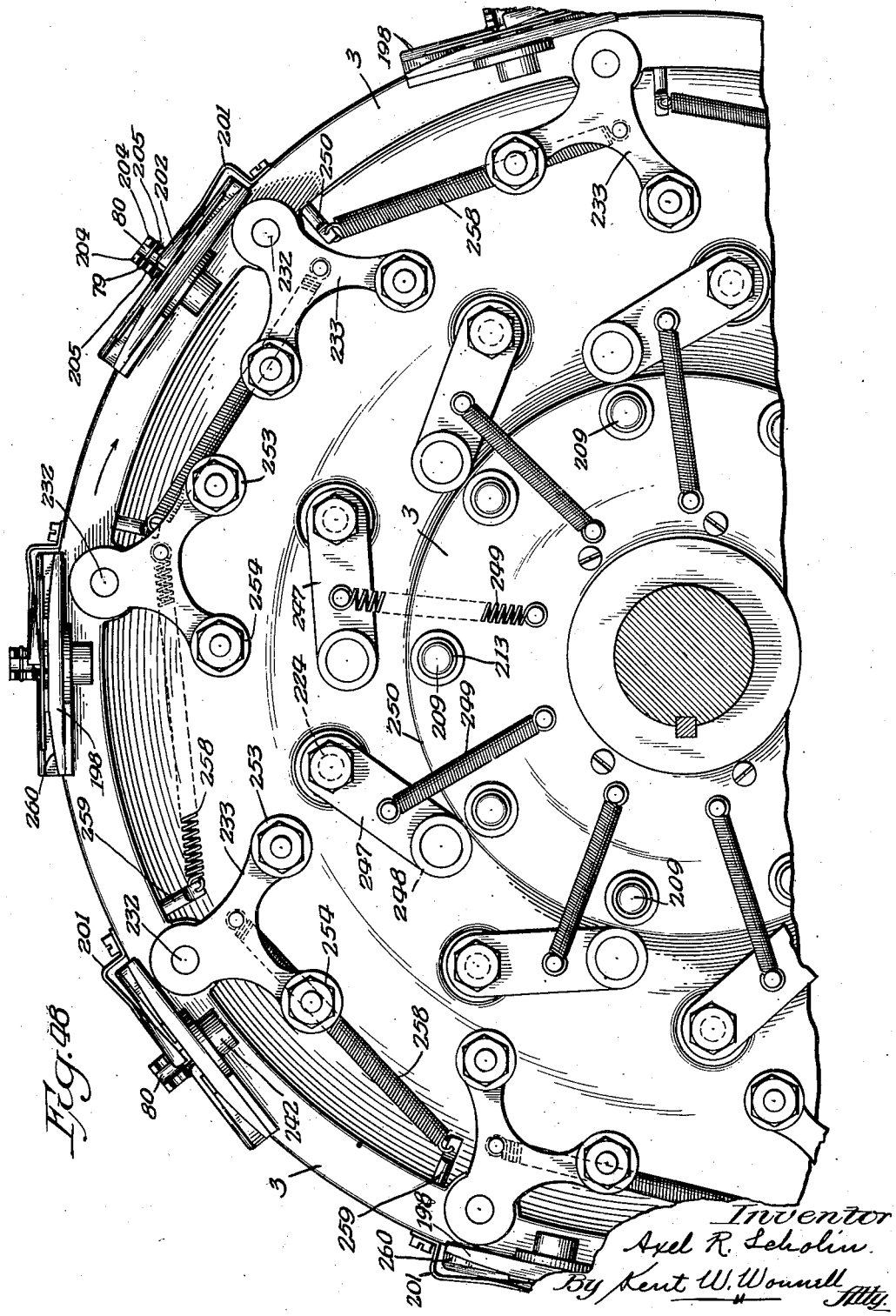

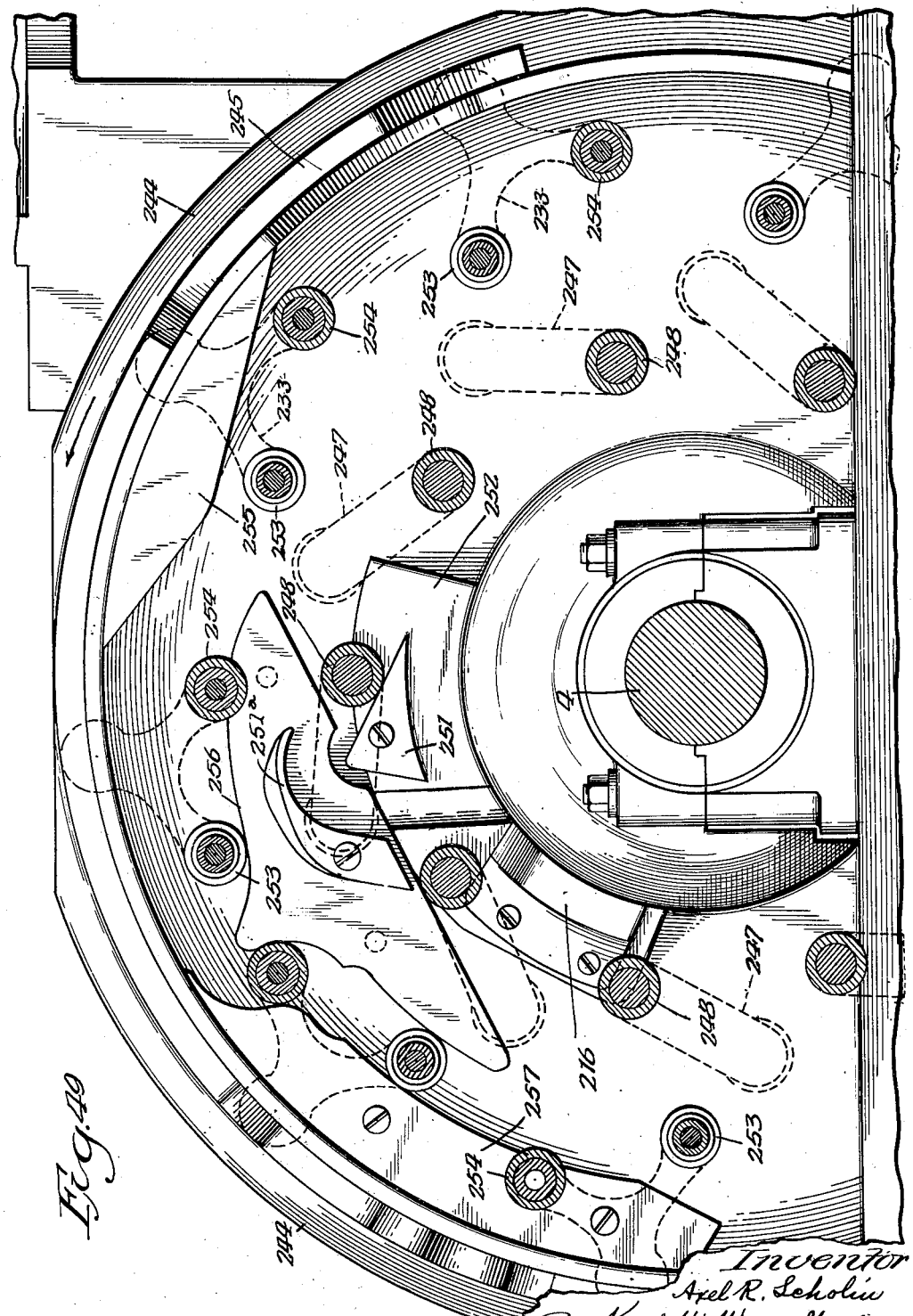

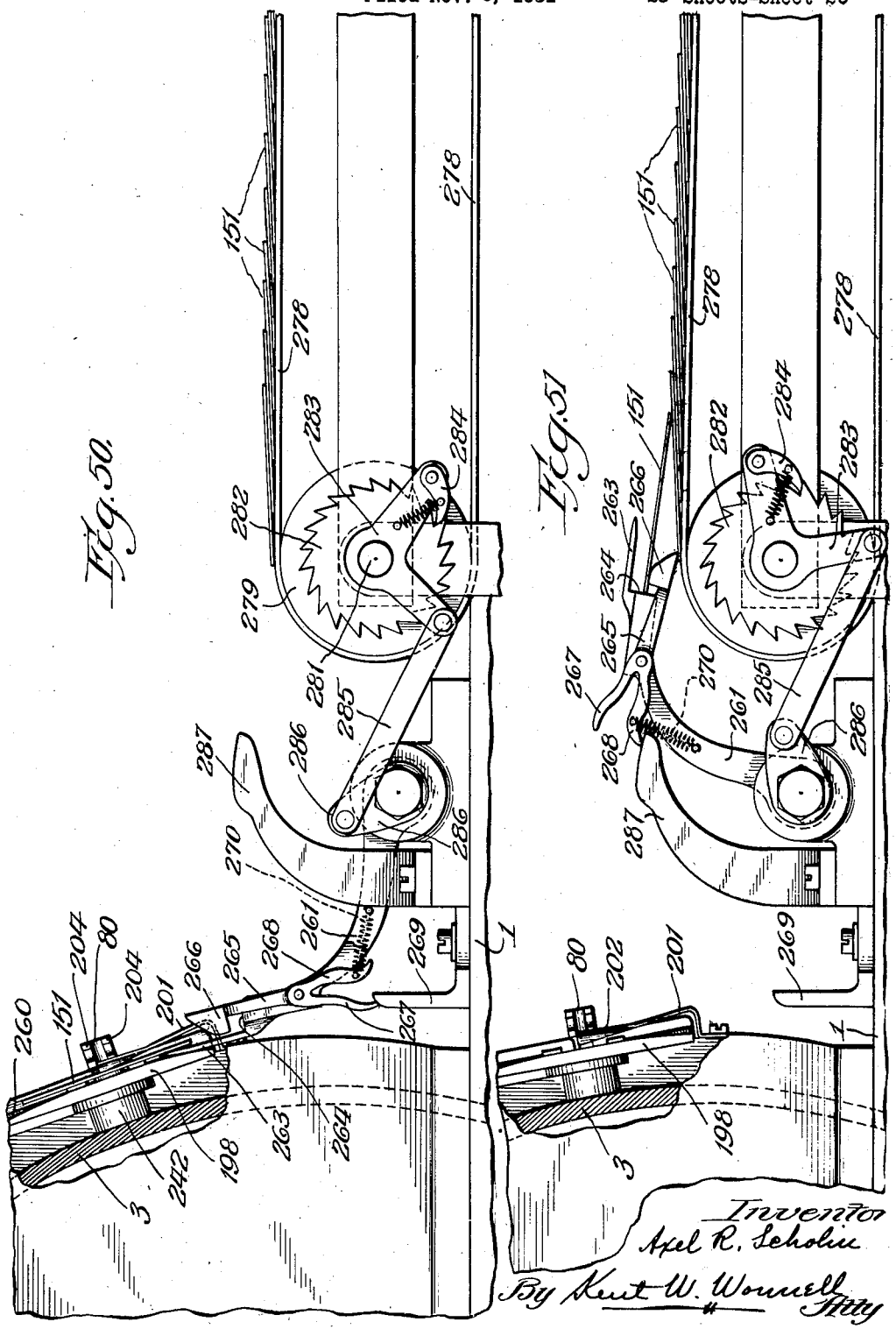

Patented Sept. 11, 1934

1,973,154

UNITED STATES PATENT OFFICE 1,973,154

TAG STRINGING MACHINE

Axel R. Scholin, Chicago, Ill.

Application November 9, 1931, Serial No. 573,934

36 Claims. (Cl. 93—91)

This invention relates in general to a machine for making a knotted string loop and applying it to a shipping tag or the like, and has for its principal object the provision of a combined automatic machine for accomplishing this result without manual attention except to fill a hopper with the tags to be strung.

Among the objects of the invention are; to form a measured loop of string from a continuous piece; to sever pieces of the string and knot the ends; to feed the loop through a tag and to pull the knotted end of the loop through that portion which is fed through the tag; to engage the severed end of the string supply for the making of a new loop; to feed the tags to be strung upon an intermittent holding drum; and to discharge the strung tags away from the holding drum.

Other objects of the invention will appear hereinafter and from the drawings illustrating a preferred embodiment of the invention.

In the drawings, Figs. 1 and 2 are opposite end elevations; Fig. 3 a top plan; and Figs. 4 and 5 are opposite side elevations of a tag stringing machine embodying this invention; Fig. 6 is an enlarged view of a portion of the machine and mechanism from the end shown in Figure 2; Fig. 7 is a detail view of the string holding mechanism; Figs. 8 and 9 are detail views of the string holding and looping mechanism in two different positions; Figs. 10 and 11 are plan views taken on the lines 10—10 and 11—11 respectively of Figures 8 and 9; Fig. 12 is a detail view of the string holding mechanism; Figs. 13 and 14 are perspectives of a portion of the string holding mechanism in two different positions; Fig. 15 is a plan view showing the string loop with its ends engaged by the knotter head; Fig. 16 is a sectional view; and Fig. 17 is a perspective of the knotter and its associated mechanism in the position shown in Figure 15.

Figs. 18 and 19 are detail views of the knotter operating mechanism; Fig. 20 is a section view taken on the line 20—20 of Figure 18; Figs. 21 and 22 are plan and part sectional views showing the knotter head in one position; Figs. 23 and 24 are plan and part sectional views showing the knotter in another position; Figs. 25 and 26 are plan and part sectional views showing the knotter head in a third position just after the cord is severed; Figs. 27 and 28 are plan and part sectional views showing the knotter head in the final knot forming position; Fig. 29 is an enlarged view showing the knotter clamping head and the string in the final stage of forming the knot; Figs. 30 and 31 are plan and part sectional views showing the knotter head in engagement with the end of the knotted cord just before its release; Fig. 32 is a section taken on the line 32—32 of Figure 30; Figs. 33, 34, 35 and 36 illustrate the tag hopper and its feeding mechanism, Fig. 33 being a section taken on the line 33—33 of Figure 34; Fig. 34 being a plan view of the feeding mechanism, and Figs. 35 and 36 being sectional views taken on the lines 35—35 and 36—36 respectively of Figure 34; Fig. 37 is a view of one end of the intermittent holding drum with parts broken away for showing the operation of the tag stringing needles; Fig. 38 is a plan view of the uppermost tag in position on the drum as shown in Figure 37; Fig. 39 is a section taken on the line 39—39 of Figure 37; Fig. 40 is a perspective illustrating a string pulled through the tag; Fig. 41 is a perspective of the next stage of the tag stringing operation with the loop spread; Fig. 42 is a perspective of the tag stringing mechanism after the loop threaded through the tag is released from the tag stringing needle; Fig. 43 is a sectional detail of the loop holding arm mounting; Fig. 44 is a perspective illustrating the string engaging head for pulling the string through the spread loop and tightening the string in the tag; Fig. 45 is a detail of the tag stringing mechanism in the position shown by Figure 40; Fig. 46 is a detail illustrating the tag stringing mechanism in the position shown by Figure 43; Fig. 47 is a detail of the tag stringing mechanism in the position shown by Figure 41; Fig. 48 shows the operating means for the tag stringing mechanism as taken on the line 48—48 of Figure 39; Fig. 49 is a sectional view of the tag operating mechanism as taken on the line 49—49 of Figure 39; and Figs. 50 and 51 are side elevations with parts broken away showing two positions of the mechanism for withdrawing the strung tags from the carrier drum and delivering them to a movable carrier.

This invention differs from a number of machines for stringing tags in that the string is first looped, then knotted, the loop end passed through the tag, and the knotted end pulled through the loop. Thus a firm double-strung connection is made with the tag which is not likely to break nor to become disconnected therefrom.

General operation

In carrying out this invention, string is taken from a continuous source of supply, the end is gripped, a loop of measured length is formed, the string is cut off and a knot is formed at the ends of the loop.

A tag is fed from a hopper or other continuous source of supply to one of a number of holders upon an intermittently rotatable drum.

In the stop interval of the drum the looped end of the string is pulled through the tag and spread out and the intermediate portion of the double string is grasped and pulled through the spread portion of the loop, and pulled tight and the stringing operation is complete.

The strung tag is then advanced step by step on the drum and is discharged therefrom to a movable carrier to avoid producing an uneven stack of strung tags close to the side of the drum.

The separate operations will be described as briefly as possible in their natural order.

The driving means

In a frame, generally designated by the numeral 1, supported by legs 2, an intermittently rotatable drum 3 is mounted upon a shaft 4 which carries a gear 5. A continuously rotatable driving shaft 6 is located at one side of the frame parallel with the shaft 4 and is rotated continuously at uniform speed by any suitable means, as a motor 7 and a conventional drive comprising belt 8, pulley 9, chain 10 and gear 11 secured to the shaft 6.

An intermittent drive mechanism connects the shaft 6 with the gear 5 which forms the subject matter of my separate application Serial No. 565,488 filed September 28, 1931, and comprising a collar 12 secured to shaft 6 in which a pinion 13 is secured eccentrically by a set screw 14 so that the pinion revolves with the collar and is eccentric to the shaft 6. The pinion 13 meshes with a gear 15 which is maintained in mesh by a link 16 connecting the pinion and gear at their axes. The gear 15 and the link 16 are carried at the free end of a rocking arm 17, the other end of which is pivoted about the shaft 4. An idler gear 18 is also carried by the arm 17 and connects the gears 15 and 5 so that there is a continuous driving connection between the shafts 6 and 4 but an intermittent movement is imparted to the shaft 4 due to the eccentric movement of the pinion 13, the up and down rocking movement of the arm 17 and the continuous engagement of the gear 15 with the pinion 13. At the top of its movement, as shown in Figures 1 and 3, the pinion 13 simply walks over or about the gear 15 without imparting movement thereto for approximately one-third of the rotation of shaft 6, as the pinion descends with the collar 12 a gradually increasing speed is imparted to the gear 15 to the lowermost part of its travel, and then as the pinion 13 is revolved upwardly in its eccentric path, a gradually decreasing speed is imparted to the gear 15, the arm 17 and the link 16 rocking correspondingly to maintain the gear 15 in mesh with the pinion 13 at all times and thus producing a satisfactory intermittent power gearing which is necessary for starting and stopping a heavy mechanism such as that mounted upon the shaft 4.

Other driving connections will be described in the order of their operation, all of the movements being obtained from the continuous driving motor 7.

String looping mechanism

This mechanism is shown most clearly in Figures 5 to 14 respectively and comprises a clamping member 18 pivotally mounted upon a projection 19 extending from a supporting plate 20 carried by the machine frame. In this member 18 is a perforation 21 through which the string 22 extends loosely from the source of supply and in the upper edge of the member 18 is a groove 23 extending through or partially through the string opening 21 so that a clamping member 24 pivoted to the member 18 engages the string and is held yieldingly in such engagement by a spring 25 attached at its opposite ends to the members 18 and 24 and tending to press the member 24 in engagement with the string. This engagement permits the string 22 to slip through the perforation 21 in feeding it from the source of supply and holds the loose end of the supply string in proper place for engagement for forming a loop. An arm 26 is also provided on the clamping member 24 by means of which it may be manually raised and operated against the tension of spring 25.

A movable string gripper comprising a clamping member 27 is pivoted on the plate 20 and has a cooperating clamping member 28 pivoted to it with a spring 29 drawing the clamping portions together. This gripping member 27 is rocked by a rod 30 which receives its motion from an auxiliary driving shaft 31 connected to the driving shaft 6 by a chain 32 and sprockets 33 and 34 as shown in Figure 2. Motion is imparted to the rod 30 by an arm 35 adjustably pivoted to the rod 30 and the arm pivoted upon a stub shaft 36 supported by a bracket 37 and the shaft connected to a bellcrank 38 having a roller 39 in engagement with a cam 40 secured to the shaft 31 and having the other arm 41 of the bellcrank adapted to engage a stud 42 projecting from the cam 40.

The movement of the string gripping member 27 toward the string supporting member 18 causes an extending tail piece 43 of the string gripping member 28 to engage a trip member 44 which opens the clamping jaws 45 and 46 of the members 27 and 28 respectively, gripping the end of the string and at the same time cutting off a looped length of string by means of cooperating knife plates 47 carried by the clamping member 27 and 48 carried by a plate 49 which has adjusting slots 50 and 51 and adjusting screws 52 and 53. At approximately the time of engagement of the knife plates a rounded or beveled edge 54 of the gripping member 27 is engaged by a spring pressure bar 55 pivoted at one end upon the plate 20 and having its free end pressed inwardly by a spring 56 (see Figure 10) so that the string will be cut by the knife blades just before the tail piece 43 of the string gripping member 28 engages the trip member 44 sufficiently to separate the grippers 45 and 46. The cut end of the supply string is immediately re-engaged by the gripping jaws 45 and 46 as the tail piece 43 slips out of engagement with the trip member 44 and in the reverse movement of the string grippers to the position shown in Figure 8 the trip member 44 is displaced by engagement of the tail piece 43 against the pressure of the trip spring 57.

In moving the string gripping member 27 away from the member 18 the latter is rocked upwardly by means of a link 58 to raise the gripped string upwardly into the path of a hook 59 carried by the loop forming arm 60. This link 58 has a projection 61 for guiding its free end in a slot 62 of a cam plate 63, and has a projection 64 engaged by the string clamping member 27 in its movement away from the member 18, as shown more clearly in Figures 8 and 9. The returning or reverse movement of the member 18 and the link 58 is caused by a spring 65 attached at one end to a perforated projection 66 on the member 18 and at the other end to a suitable projection from the supporting plate 20.

In order to guide the string in its loop forming movement, a guide plate 67 is secured to the supporting plate 20 and has a projection 68 with an annular edge for guiding the string as clearly shown in Figures 8 to 12.

To extend and form a loop of string, the string grippers 27 and 28 are moved backwardly, the string supporting member 18 is raised into the path of the hook 59 and the arm 60 is moved to pull out the loop by a mechanism shown more clearly in Figures 5 and 6 and comprising a closed cam 69 secured to and rotatable with shaft 6 and adapted to engage a projection 70 carried by a pivoted arm 71 which is connected to a longer arm 72 by a cross piece 73 so that a rocking movement is given to the free end of the arm 72 adjacent a guide plate 74 at the top of the machine which carries guideways 75. The hook supporting arm 60 is mounted to slide in the guideways 75 and is connected to the arm 72 by a rod 76 pivoted at one end to a head 77 which supports the arm 60 and having an adjustable mounting 78 at the other end for pivotally connecting it to the end of the arm 72.

In the movement of the arm 60 extending the string to form a loop 79, the hook passes in advance of a forked loop holding head 80 which is carried in a path transverse thereto by the rotatable drum 3 so that the looped end of the string is engaged and carried by the forked end of the head 80 as this head is moved by the drum 3, and as the hook 59 is moved reversely by the arm 72, the hook is disengaged from the loop of the string and returns for forming another loop.

In this movement of the hook it passes first on one side of the head 80, the head advances and the hook is returned on the other side of the head 80 so that the hook passes entirely about the head in its movement, discharging the string.

As soon as a loop is formed and engaged with a head 80 the string ends of the loop are returned to parallel position as shown in Figure 11, the ends of the formed loop are cut by blades 47 and 48 and the free ends of the loop are engaged and held for movement with the drum to the knotting position where a knot is formed in the end of the loop. The head 80 is rocked toward the end of the loop to receive the closed end from the hook 59 and is then moved in the reverse direction to maintain a constant tension upon the string and a pivoted arm 81 is supported below the guide plate 74 in the path of the loop to prevent looseness of the string at this time.

To carry a formed loop to the knotting position, a supporting ring 82 in the form of a wheel is supported by the shaft 4 and moves intermittently with the drum 3. It has engaging devices for carrying the formed loops to the knotter corresponding to the heads on the drum and comprising a spring gripper 83 carried directly by the ring 82 (see Figures 10, 15 and 17) held yieldingly downwardly by a spring 84 and adapted to seat the two strands of a formed loop in a groove 85 at one side of the wheel and against a projection 86 at the other side. In order to insure that the two strands are in this groove 85 at the knotting position, a contact finger 87 (see Figure 3) is located to engage the strands of the formed loop as it is moved into the knotting position.

The free ends of the loop are also engaged by resilient gripping members 88 and 89, shown more clearly in Figures 7, 12, 15, 17 and 18.

One of the gripping members has a projection 90 and the other has a corresponding notch 91 covered by a thin resilient plate 92 which insures that the string as engaged by the gripping members will abut the projection 90 and will be engaged by the thin plate 92 rather than by the full width of the gripping members so that there will be a sure engaging grip for a portion of the time.

These gripping members 88 and 89 are carried at a distance from the wheel 82 by a short plate or yolk 93 which may also form the projection 86 previously referred to, the yolk 93 being of sufficient width to position the knotting head between the wheel and the gripping members 88 and 89.

To operate the gripping members 88 and 89, one of the gripping members is pivotally mounted and has a projecting tail piece 94 with a projection 95 for engaging an overlying cam projection 96 (see Figure 12) of the cam plate 63. This engagement raises the gripping member 89 against the tension of a spring 97 inserted between the gripping members 88 and 89 and intending to close their gripping jaws so that the jaws receive the string against the projection 90 and then the projection 95 slips off of the engaging cams 96 firmly gripping the ends of the formed loop.

When the gripping member 89 is released by the cam 96 the thin plate 92 holds the ends of the string only by the pressure exerted by the spring 97 and a slight slippage of the string is possible due to the tightening action of the loop holding head 80, but at the knotting position, as shown more clearly in Figures 18 and 20, it is desirable that the string ends of a formed loop be tightly engaged and for accomplishing this a yielding abutment 98 is slidably mounted in the frame in a position to engage the tail piece 94 of the gripping member.

This abutment 98 is slidably held by a removable plate 99 and is pressed upward by a spring 100 which engages a perforated projection 101 on the abutment through which a rod 102 extends surrounded by the spring, the lower end of the rod being adjustably threaded into a lug 103 projecting from a frame plate 104, and the lower end of the rod 102 having a collar 105 which engages the lower end of the spring 100. To limit the movement of the abutment 98 it has a slot 106 into which a pin 107 supported by the plate 104 extends, and to position the abutment at the proper engaging height, an arm 108 is pivoted at its upper end to the abutment and has a projection 109 at its lower end which is engaged by a finger 110 held in place by a clamping plate 111 and having an operating arm 112 engaged by a fitting 113 at the end of a push rod 114 actuated by an arm 114a (see also Figures 2 and 13) mounted upon the shaft 36 and actuated by a cam 114b mounted on the shaft 31. Thus as the tail piece 94 of the gripping member 89 engages the end of the abutment 98, the gripping members 88 and 89 are forced tightly together preventing the ends of a formed loop from being dislodged at the knotting position. It will be seen however, that the string is free to slip in the holding clip 83 which allows the knotting head to pull back a portion of the formed loop against the tension of the loop holding head 80 during the knot forming operation, thus keeping the string taut during the knotting operation.

*String loop length adjustment*

In applying the string loops to the tags it is often desirable to vary the length of the loop which requires that a longer measured length of string be pulled out and cut off from the supply string. This is accomplished by mounting the supporting ring 82 and its associated parts for movement longitudinally of the shaft 4 and without varying the length of stroke of the loop engaging hook 59, as this hook is moved the full length of its stroke in each direction, as shown by Figure 5, the difference being that it picks up or engages the string to form a measured loop 79, depending upon the position of the supporting ring 82.

The supporting ring 82 and its associated parts are mounted for longitudinal movement upon the shafts 4 and 31, the movable frame portion 300, as shown more clearly in Figures 6, 7 and 18, slidable on the shaft 31 and having a slide 301 movable upon a guide plate 302 attached to the main frame, the upper portion of the guide comprising an attachable cap plate 303. Extending outwardly from the slide 301 are projections 304 at each side of a hub 305 of the supporting ring 82 so that the movement of the slide 301 in either direction will carry with it the supporting ring 82 and the frame 300. The hub 305 and the shaft 4 have a key 306 for permitting the hub to slide along the shaft and still maintain the timing connection of the parts carried by and associated with the ring 82 and the parts carried by the frame are also suitably keyed to the shaft 31 to prevent their engagements. In order to additionally support the frame 300 and to relieve any strain upon the shaft 31, which is relatively small in diameter, a bearing plate 307 is mounted in a standard 308 secured to the main frame 1 which makes a sliding engagement with the under side of the frame 300, permitting it to move longitudinally along the shaft 4.

The supporting ring 82 and the frame 300 may be moved with the slide 301 with respect to the shaft 4 for varying the measured length of the loops in any suitable way and preferably by means of a screw 309 inserted from the end of the machine into the guide plate 302 and having a hand wheel 310 at the outer end for rotating it. This screw engages a toothed rack 311 secured to or formed integral with the guide plate 301 and operating in a slot 312 provided therefor in the guide plate 302, the rotation of the screw 309 in either direction causing a corresponding movement of the slide 301. A set screw 313 (see Figure 6) may be inserted in a boss 314 of the guide plate 302 for engaging the screw 309 and holding it positively in any position in which it has been set by rotating the handle 310.

With this construction the loop is made longer or shorter without affecting the other operation of the string gripping and loop forming mechanism, all of the parts preserving their relative position and timing so that the length of the loops can be changed without other adjustment.

*Knotting the loops*

The knotter comprises string clamping parts which are moved vertically and the knotter head is rotatable to engage and discharge the string during the knot forming operations. The position of the knotting head with respect to the other parts of the machine is shown in Figs. 3 and 4, as well as in Figs. 15, 16 and 17, and the operation of the knotter is shown more clearly in Figs. 18 to 32 respectively.

The knotter head comprises a central stem 115 and a movable sleeve 116 in which it is movable and slidable, the stem and sleeve having cooperating hooked clamping jaws 117 and 118 respectively. The sleeve is slidable in a supporting frame lug 119 which has a separate cam 120 pivoted thereto (see Fig. 32) at its upper end for engaging and operating a string clamp 121. Below the lug 119 a gear 122 is secured to sleeve 116 and this gear meshes with the teeth 124 of a gear segment 125 mounted for rotation upon the frame and having gear teeth 126 in engagement with the teeth of a rack 127 which is reciprocated in the frame. This toothed connection and rack movement give the knotter head substantially a complete rotation first in one direction and then in the other.

To raise and lower the knotter a lever 128 is pivoted in the frame intermediate its ends having an arm with a forked or perforated end 129 to engage the groove of a collar 123 threaded on the lower end of the sleeve 116 for moving it longitudinal relative to the stem. Secured to the stem 115 below the sleeve 116 is a collar 130 for engaging one end of a spring 131 surrounding the stem 115, the other end of the spring engaging the lower face of the collar 123 and the lower end of the sleeve 116. This spring tends to keep the jaws 117 and 118 together.

At the lower end of the stem 115 is a frame support 132 and engaging the lower extremity of the stem 115 is an arm 133 of a lever 134 pivoted intermediate its ends in a frame bracket 135 and actuated to operate the stem 115 and its clamping jaws 117.

The levers 128 and 134 are actuated from shaft 31 by means of a cam 136 which engages a contact roller 137 on lever 128, and a cam 138 which engages a projection 139 at the end of the lever 134. These levers are held in constant contact with their respective cams and a spring 140 is attached at one end to the lever 128 and at the other end to the frame projection 135 (see Figure 18).

To rotate or oscillate the knotting head, the slide rack 127 is reciprocated by means of a cam 141 mounted upon the shaft 31 and engaging cam rollers 142 and 143 at opposite sides of the cam for positively moving the rack in both directions, thereby rotating the knotting head correspondingly.

The string clamp 121 is mounted upon the sleeve 116 to swing upon a pivot 144 when engaged by the cam 120, as shown more clearly in Figures 17, 26, 28 and 32, and the cam is pressed resiliently upward by a spring 145 and is pivoted in the frame lug 119 at a distance from the knotter head, the height of the cam being limited by a set screw 146. This string clamp is actuated by its cam 120 to clamp the string tightly in a notch 147 of the sleeve member 116.

In the head of the stem 115 opposite the clamping jaw 117 is a projection 148 (see Figure 17) and at the sides of this projection at the top of the sleeve 116 are projections 149 so that as the stem head 117 is raised with respect to the sleeve the projection 148 is raised above the projection 149 but in its first position for engaging the loops. These projections 149 are above the projection 148 as shown in Figure 22.

In general the operation of the knotting head is as follows: The ends of a string loop are brought in contact with the knotter head in raised position, as shown in Figure 17, with the ends of the string firmly clamped by the gripping members 88 and 89, the string engaging below the clamping jaws 117 and 118 so that when the jaws are turned in the direction of the arrow, as shown in Figure 21, and the knotter head moved downwardly as shown in Figure 22, the tip ends of the jaws 117 and 118 will engage under the string and the continued rotation of the knotter head will cause the gripping member 121 to engage the string, and the string to be received in a notch 150 (see Figure 21) at the top of the clamping jaw 117 and around the projections 149, as shown in Figure 23. This produces a complete turn of the string around the head and as shown in Figures 23 and 24, the clamping jaws 117 and 118 are now spaced apart to engage the ends of the string adjacent the string grippers 88 and 89 at the same time these grippers are released by the movement of the tail piece 94 from the spring abutment 98. The slack string for the complete turn about the knotter head is obtained by pulling the loop holding head 80 toward the knotter head and under the spring clip 83.

Continued rotation of the knotter head in the same direction as indicated by Figures 25 and 26 raises the projection 148 to disengage the string from the projections 149 which causes the turn of the string about the clamping jaws to slip over the top of the jaws and toward the end thereof as shown by Figures 27 and 28, the string being drawn tight by the loop holding head while the extremities are still held by the gripping jaws 117 and 118 until the knot is completely formed as shown by Figures 30 and 31, whereupon the parts will be in position for engagement of the knotting head with the next formed loop.

Thus the string loop is formed, cut, carried and the ends joined by a knot before the loop is applied to a tag and the loop thus formed is supported by its loop carrying head in a position to be threaded through a tag through which the looped end is strung.

Tag feeding mechanism

As shown in Figures 33 to 36, a number of tags 151, such as shipping tags or the like, having strengthening eyelets 152 on both sides of a stringing perforation 153 are deposited in an adjustable feeding hopper 154 suitably supported by the frame and they are fed successively from the bottom of the hopper, first by means of a slide 155 at the underside which engages the eyelet of the lowest tag and then the upper eyelet of this tag is engaged by a reciprocating finger 156.

The slide 155 has a support 157 connected by a projection 158 to one arm of a lever 159 pivoted on a frame bracket 160 and the other arm of the lever actuated by a rod 161 which receives its motion from a lever 162 (see Figure 1) pivoted at its lower end to the frame 1 and having an intermediate roller 163 held in engagement with a cam 164 carried by the shaft 6 by means of a spring 165.

The upper feeding finger 156 is reciprocated by a slidable carrier 166 connected by a link 167 with one arm of a lever 168 also pivoted on the frame bracket 160 and having its other arm connected by an adjustable link 169 to the upper end of a lever 170, the lower end of which is pivoted in the frame which is actuated against the tension of a spring 171 by means of an intermediate cam roller 172 (see Figures 1 and 5) in engagement with a cam 173 mounted on the shaft 6.

In moving the feeding finger 156 it is desirable to lift it from engagement with a tag which has been advanced by it and for this purpose the finger is mounted upon a bar 174 pivoted in the carrier 166 and extending from the bar or the finger is a projection 175 adapted to slide under a pivoted guide rail 176 in its feeding direction but to engage the outer downwardly turned end 177 of the guide rail at the outer end of its movement and to engage and be raised above the guide rail by the projection 175 in its backward direction of movement as indicated in Figure 39. This guide rail 176 is pivoted upon a supporting angle plate 178 secured to the frame and engages a stop pin 179 to limit its downward movement. The feeding finger 156 and its arm 174 are resiliently returned to feeding position as soon as they slip off the pivoted end of the guide rail 176 by means of a spring 180 surrounding a bolt 181 which extends through the arm 174 and into the supporting carrier.

In adjusting the hopper to fit or receive tags of different sizes, the sides 182 and 183 are moved oppositely by a bar 184 having opposite threads engaging the supports for the sides and having an attached head 185 for turning the bar and a nut 186 for locking it in any desired position. At the rear is a plate 187 having an angular supporting plate 188 with a slot 189 therein engaged by a fastening nut 190. At the front of the hopper is a plate 191 with a bent lower end to permit only one tag to be discharged at a time and with a notch 192 in the central portion of the plate to admit the eyelets 152 therethrough without engagement. Also pivoted to the outside of the front end of the hopper is a guard 193 having a compression spring 194 surrounding a bolt 195 which extends through the guard plate and is pressed with a nut 196 engaging the outer end of the spring and adjustable on the threaded end of the bolt 195. This guard plate bears against the upper face of the tags as they are fed from the hopper and presses them downwardly against spring fingers 197 which engage the underside of the tag, thus insuring that the tag is fed evenly and against a slight pressure.

This feeding movement discharges tags in succession to the holding drum 3 upon a platform or carrier 198 directly opposite the feeding hopper and in the position of the knotter, each carrier having a central groove 198a (see Figs. 3, 5, and 38) to engage the lower eyelet 152 of a tag in guiding its feeding movement.

The carrier, shown also in Figs. 40 to 44, has a flange 199 to limit the movement of the tag with an overhanging ledge 200 to prevent the tag from moving upwardly. Also at the side of the movable carrier is a spring holding clip 201 having an upwardly turned edge 202 and secured to the drum 3 at the side of the carrier 198 by fastening screws 203 so that a tag will slip under the clip and will be held yieldingly thereby on the carrier.

Tag stringing operation

In general, the looped end of a formed loop 79 is moved by its carrier head 80 to a position over the perforation of a tag, a hook is inserted through the tag opening engaging the string loop and pulling it downwardly through the tag; the end of the loop is engaged and the adjacent portion is spread out so that another hook inserted from the under side through the spread portion engages the overlying strands of the string; as the drum is advanced it pulls the knotted end of the string through the spread loop, tightens the string on the tag, thus completing the stringing operation. As this operation takes place the tag is advanced from its position opposite the knotter, and the loop holding head 80 which is mounted upon the intermittently rotating drum, is positively and resiliently moved.

The mechanisms for carrying out the tag stringing operation are shown more clearly in Figures 37 to 46 and the operating cams are shown in Figures 48 and 49.

Each loop holding head 80 has upper forked ends 204 and a lower forked end 205 which engage the loop as it leaves the loop forming hook 59 as previously explained. Each head 80 is mounted in an arm 206 pivoted adjacent the axis of the drum 3 in a block 207 secured to the drum, the arm being pressed outwardly by a spring 208. To control the arm a rod 209 extends through a hole 210 in the arm and through the drum 3. At its outer end the rod has a washer which bears against a block 211 and lock nuts 212 adjustably threaded at the end of the rod. Adjacent the inner end and within the drum is a bar member 213 secured to the rod with a collar 214 at one end engaged by one end of a spring 215, the other end of which engages the inside of the drum and tends to pull the arm engaging head of the rod inwardly. The other end of the rod extends beyond the inner portion of the drum and engages a cam block 216 (see Figure 43) at the proper portion of its travel to prevent the spring 215 from drawing the rod and the arm 206 inwardly toward the drum.

When the head 80 is first engaged by a string loop 79, the spring 215 draws the loop yieldingly tight but in the knotting operation the arm 206 gives slightly until the knotting is complete whereupon the head 80 positions the looped end directly over the hole 153 in a tag 151 and directly over a needle hook 217 which is adjustably mounted in a projection slide 219 by means of a set screw 220. This slide 219 is held by side guide rails 221 and is moved by means of a projection 222 engaged by the forked end of an arm 223, the other end of which is pivoted on a shaft 224 extending through the drum and moved by a mechanism hereafter described.

The hooked needle 217 is thrust quickly upward through the opening 153 in the tag, engaging the loop of the string between the forked ends 204 of the holder and pulling the string quickly downward, through the hole in the tag until the parts are in the position shown in Figure 40. At this time a projection 225 carried by the arm 206 extends into the loop and when the looped end is released by the hooked needle 217 a slide 226 is moved outwardly from below the carrier 198 and the slide has a rounded spreading portion 227 which presses the strings laterally as the tip of the loop is engaged by the projection 225 so that the loop is spread apart as shown in Figure 41.

In the plate 226 adjacent the rounded spreading portion 227 is an opening 228 sufficiently large to admit a hook 229 therethrough from the under side as shown in Figures 41 and 47. This hook 229 has a pointed extremity 230 to prevent it from engagement with the looped string and the hook is mounted upon an arm 231 pivoted in the drum 3 on a shaft 232 which extends through the drum, as shown by Figure 39, and is provided at its other end with a double arm operating lever 233, as shown also in Figure 48. Also pivoted upon the arm 231 is a holding jaw 234 extending adjacent the engaging portion of the hook and having an end projection 235 for closing against the hook 229 and a lateral projection 236 which engages the under side of the spreader plate 226 when the hook 229 is thrust through the plate 226 as shown in Figures 41 and 47. A spring 237 connected at its ends to the holding jaw 234 and to a projection 238 of the arm 231 or the hook member 229 tends to draw the holding jaw in engagement with the hook. The holding jaw also has a projecting tail piece 239 adapted to engage a projection 240 of a plate 241 secured to the drum 3 for the purpose of holding the gripping jaw 234 out of position to engage the hook when the hook 229 is withdrawn from the plate opening 228, and also to separate the jaw 234 and hook 229 for freely releasing the string as shown particularly in Figure 37, the jaw gripping the string in the hook 229 and pulling it through the string loop as shown more clearly in Figure 44.

While this operation of drawing the knotted end of the string through the widened loop is taking place the drum 3 is being moved from the position in which the knot is formed to the next intermittent stop position and the knotted end of the loop is drawn from its engagement with the spring clip 83 carried by the ring 82. After the knotted end of the string is pulled through the widened loop, the gripping action is continued, the plate 226 is pulled back, and the widened loop itself is pulled out, tightening the string loop on the tag as shown more clearly in Figure 4.

To operate each plate 226 it carries a cam roller 242 at its rear end (see Figures 4, 39, 40, 41, 42 and 44) adapted to engage in a cam slot 243 at the periphery of a bearing frame 244 in which the shaft 4 is mounted approximately of the same diameter as the drum 3. This slot is formed in part by a plate 245 and a projection 246 secured to the bearing frame 244, the latter causing a quick withdrawal of the plate 226 after the hook 229 pulls the knotted end of the string through the loop and allowing the loop to be pulled up tightly through the eyelet and around the end of the tag.

After the knotted end of the string is pulled through the loop the holding jaw 234 is opened to prevent the knotted end of the string from being held or confined by any of the mechanism and so that the tag can be discharged from the drum.

As soon as the looped end of the string is disengaged from the projection 225 of the holding head the arm 206 may be released and pressed outwardly by its spring 208 at which time the rod 209 will be in engagement with its operating cam 216, compressing the spring 215, as shown more clearly in Fig. 43.

In operating the needle slide plate by means of the shaft 224 as shown by Figs. 39, 48 and 49, there is a cam arm 247 at the end of each shaft 224 having a cam roller 248 at its free end and with a spring 249 attached at one end to the arm 247 and at the other end to a projection on the drum 3 tending to hold the arm against a plate 250 secured to the drum. To quickly insert the needle 217 through the opening in the tag there is an angular cam 251 secured to a supporting block 252 attached to the bearing frame 244 adapted to engage a cam roller 248 for raising this end of the arm 247 against the tension of its spring which quickly withdraws the arm after passing the apex of the projection 251. To prevent overthrow and to positively pull down the needle 217 by means of the arm 247, a deflector 251a (see Fig. 49) is secured to cam 256 above the angular cam 251 which directs the roller 248 sharply downward over cam 251.

Also in operating each shaft 232 for the hook 229, (see Figs. 48 and 49) the lever 233 which is pivoted on the inner face of the drum has two cam rollers 253 and 254 adapted to engage cam plates 255, 256 and 257 at the end of the bearing plate 244, each operating lever 233 being engaged by one end of a spring 258, the other end of which is attached to a projection 259 at the inside of the drum 3, the spring tending to hold the forward cam roller 253 in a position withdrawing the hook 229 from the periphery of the drum. As each forward roller 253 approaches its cam 256, the rear roller 254 first engages its cam 255, tilting the lever 233 to insure that the forward roller clears the point of its cam 256, the shaft 232 is rotated, moving the hook 229 outwardly as shown in Fig. 37, until the peak of the cam 256 is over-run (Fig. 47) whereupon the hook member is quickly withdrawn and the cam 257 is engaged to hold the hook member 229 in an intermediate position, as also shown in Fig. 37, before it is returned to its normal position.

This completes the threading of the tag and it is supported upon a plate 198 where it is yieldingly held by a spring clip 201.

Tag removing means

In each of the supporting plates 198 are a number of transverse slots 260 which being curved about the axis of curvature of the drum 3 are deepest at the edges of the plate 198.

The removing device comprises a number of arms 261 mounted upon a common shaft 262 and each having a reduced resilient finger 263 adapted to engage in one of the slots 260 of the plate 198 so that as the drum 3 is rotated the fingers 263 will extend under a tag 151 carried by one of the plates 198. The spring clip 201 which holds the tag in connection with the plate is disposed between adjacent slots 260 so that the spring fingers 263 will not engage the spring clip but will in effect pick a card from between the plate and the clip as the drum 3 is rotated. In order to more positively engage the tags, each arm 261 is formed with a shoulder 264 at the base of the finger adapted to stop and position a tag as the drum is rotated. Attached to one or more of the arms 261 is a pivoted gripper 265 having a contacting projection 266 adapted to engage a tag held by the fingers 263, the lever having forked extremities 267 and 268, the former of which engages a stop member 269 secured to the frame for holding the projection 266 out of engagement with a tag. A spring 270 connected to the other forked extremity 268 and to the arm 261 tends to press the projection 266 in engagement with a tag so that as soon as the arms 261 are raised to disengage the extremity 267 from the stop member 269, the lever 265 will resiliently hold a tag in engagement with the fingers 263.

The shaft 262 and the arms 261 are rotated intermittently by an arm 271 secured to the shaft and connected by a link 272 with one end of a lever 273 pivoted upon a frame support 274 and having a cam roller 275 at its other end in engagement with a cam 276 secured to the shaft 31 which is mounted in the support 274. The roller 275 is pressed against the cam 276 by means of a spring 277 and the arms 261 are intermittently operated in accordance therewith.

In order to prevent the tags from being deposited in a pile or close to the machine, a carrier belt 278 is mounted at the side of the machine upon pulleys 279 and 280 and this belt may be actuated by means of a shaft 281 on which one of the pulleys 279 is mounted, the shaft carrying a ratchet pinion 282 and a ratchet lever 283 having a spring pressed dog 284 to engage the ratchet teeth in one direction of movement. To reciprocate the lever 283, one arm is connected by a link 285 to an arm 286 mounted on the shaft 262.

Supported between the arms 261 is an operating projection 287 positioned to engage the forked extremity 268 of the lever 265 and to swing it as shown in Figure 51 against the tension of its spring 270 to release a tag 151 held by it against the spring fingers 263, thereby releasing it and discharging the tag upon the moving belt 278 from which the tags may be taken or discharged.

Résumé

With this construction the tag stringing operation is entirely automatic, it being necessary only to supply the string from a ball or in a continuous strand, to deposit tags in the hopper and to remove the finished strung tags. Continuously applied power is changed into intermittent movement where necessary and all of the mechanism is driven by a continuous power device such as an electric motor.

In the operation the string is extended into loops, the ends brought together and severed and the loop thus formed is carried to the knotting position. In the knotting position a knot is formed joining the ends and in this position the other end is pulled through the eyelet of a tag and the pulled through portion spread out so that the knotted end of the string can be drawn therethrough and pulled tight about the end of the tag.

The strung tags are removed from the carrier drum by an intermittent mechanism which delivers the tags away from the drum as for example, upon a movable carrier belt, from which they may be picked up or discharged as desired.

I claim:

1. In a tag stringing machine, means for forming a string loop from a continuous supply of string, means for severing the looped string portion, means for knotting the ends of the string loop, means for drawing the looped end of the string through the hole of a tag and pulling the knotted end through the looped end and tightening it about the end of the tag.

2. In a tag stringing and knotting machine, the combination with means for forming a string loop of predetermined length and moving the ends of the formed loop together and moving the loop thus formed to a knotting position, of a knotter to tie the ends together, means for pulling the string loop through the hole of a tag, spreading the loop and drawing the knotted end of the string through the spread loop, and means for feeding the tags to receive the loop.

3. In a tag stringing and knotting machine, means for forming a string loop of measured length and bringing the ends together, means for engaging the ends and carrying the loop to a knotting position, a knotter to tie a knot in the ends of the loop, means to feed a tag with its hole below the rounded end of the loop, a hook to draw the end through the hole, means to spread the rounded end and another hook to draw the knotted end of the loop through the spread portion and to tighten it upon the tag.

4. In a tag stringing machine, means to form a measured loop and bring the ends thereof together, a carrier and grippers on the carrier to tightly engage the ends of the string and to move the loop bodily to the knotting position, means to tie a knot in the ends of the string and to draw the rounded end of the loop toward the knotter in the knotting operation, and means for releasing the end gripping means in completing the formation of the knot.

5. In a tag stringing machine, means for forming a measured loop, means for bringing the ends together and separate means for inserting the rounded end of the loop through a tag, means for feeding tags and an intermittently movable drum to receive the formed loops and tags.

6. In a tag stringing and knotting machine, a string loop former comprising a supply string holder, a gripper to engage the end of the supply string and move it away from the holder, a member to engage the string between the holder and the gripper for extending the string in a measured length and means for moving the gripper to close and release the measured loop thus formed.

7. In a tag stringing machine, a loop former comprising a perforated supply string holder, a gripper for engaging the end of the supply string and moving it away from and toward the holder, means for engaging the string between the holder and the gripper for extending the string to form a loop, and a cut-off device for severing the string when the gripper returns the end of the formed loop.

8. In a tag stringing machine, loop forming mechanism comprising a supply string holder, a gripper for the end of the string movable away from and toward the holder, a loop forming head to engage the string when the gripper is moved away from the holder to form a loop and a cut-off device to sever the string when the gripper returns to the holder, the gripper thereupon releasing the string of the formed loop and engaging the end of the supply string.

9. In a tag stringing machine, a loop former comprising a movable supply string holder, means for gripping the end of the supply string and moving it away from the holder, a string engaging member movable between the holder and the gripping means for extending the string to form a loop, and means for moving the holder to position the string between it and the gripping means in the path of the member.

10. In a tag stringing machine, a tag string loop former comprising a supply string holder, a gripper to engage the end of the supply string and move it away from the holder, a reciprocating member to engage the string between the holder and the gripper for extending the string in a measured loop, and means for varying the position of the supply string holder and gripper to vary the length of the formed loops.

11. In a tag stringing machine, a tag holding drum, a shaft upon which it is rotatable, means for forming a measured loop comprising string end grippers and a movable loop extender, said means being movable bodily in the direction of the shaft and relatively to the drum to vary the length of a loop formed thereby.

12. In a tag stringing machine, means for forming a loop and gripping the ends of the loop together, a shaft upon which the gripping means is rotatable, and means for adjusting the position of the gripping means along the shaft to vary the length of the loops.

13. In a tag stringing machine, means for forming a loop of string from a continuous string supply, and means for adjusting a portion of said forming means to vary the length of the string loop.

14. A tag stringing machine comprising a string loop former comprising a holder for the end of a continuous supply of string, a gripper for engaging the end of a supply of string and moving it away from the holder, a loop former having a path of movement to engage the string between the gripper and the holder, and means for moving the gripper and holder to vary the point of engagement of said member with the string thereby varying the length of the formed loop.

15. In a tag stringing machine, a loop former comprising a movable supply string holder for lightly engaging the string as it moves therethrough, a gripper for engaging the end of the supply string and moving it toward and from the holder, a loop engaging hook movable across the path of the gripper, and means for moving the holder to position the string in the path of the hook as the gripper is moved away from the holder to form a loop of measured length.

16. In a tag stringing machine, loop forming and carrying mechanism comprising a supply string holder, a gripper for engaging the end of the supply string and moving it away from and toward the holder, means for engaging the string between the holder and the gripper to form a loop of measured length, cut-off means to sever the string when the ends of a formed loop are brought together, means for releasing the gripper from a formed loop and engaging the end of the supply string, and a movable carrier with gripping means thereon for engaging the string ends of a formed loop and moving it to the next operating position.

17. In a tag stringing machine, a loop former and carrier comprising means for engaging the end of a supply string extending the string to form a loop, cutting a measured length of string and bringing the ends of a formed loop together, a carrier having gripping means for engaging the string ends of a formed loop and having a resilient clip on the carrier for engaging the string ends at a distance from the gripping means to receive a knotter therebetween.

18. In a tag stringing machine, loop forming and carrying means comprising means for gripping the end of a supply string, extending it to form a loop, bringing the ends of the loop together and cutting off the string, a carrier head for engaging the rounded end of the loop thus formed, a gripper for tightly engaging the string ends of the formed loop, a spring clip for engaging the string ends adjacent the gripper, and a carrier including means for supporting the head, the gripper and the resilient clip for moving the formed loop bodily to the next operating position.

19. In a tag stringing machine, a loop former and a carrier comprising an intermittently movable carrier wheel, a supply string support, means for gripping the end of the supply string and moving it away from the support, a hook for engaging the string between the support and the gripping means as the latter is moved away from the support, means for bringing the ends of a formed loop together and severing a measured length of string, a gripper on the carrier for engaging the ends of a formed loop, a knotter-head engaged by the string in the movement of the carrier wheel, and a yielding support for the rounded end of the loop movable toward the knotting head during the knotting operation.

20. In a tag stringing machine, loop forming and carrying mechanism comprising an intermittently movable drum and carrier wheel, a string supply support, means for engaging the end of the supply string and moving it away from and toward the support, a transversely movable hook for engaging the string in its movement away from the support, a carrier head upon which the looped end of the string is engaged by the hook, means for severing the string when the engaging means moves toward the support, means in connection with the carrier wheel for gripping the end of a formed loop string and moving it bodily with the carrier head.

21. In a tag stringing machine, loop forming and carrying mechanism comprising a supply string holder, means for engaging the end of the supply string and moving it away from and toward the holder, a transversely movable member to engage the string and form a loop when the engaging means is moved toward the holder, and a carrying head for the rounded end of the formed loop comprising a pronged member around which the transversely movable member travels and deposits the rounded end of the loop.

22. In a tag stringing machine, means for cutting off and forming a measured loop from a continuous supply of string, a carrier for moving the formed loop laterally, said carrier comprising gripping means for tightly engaging the ends of a formed loop and a yielding head engaging the rounded end of the formed loop, a knotter head engaged by the loop when carried laterally between the ends thereof, means actuating the knotter head to form a knot at the ends of the loop drawing the loop supporting head toward the knotter, and means for releasing the ends of the formed loop when the knot is formed.

23. In a tag stringing machine, means for cutting off and forming a measured loop from a continuous supply of string, a carrier for the loop comprising a gripper for the ends and a yielding head for the rounded end of the loop, a spring holding clip on the carrier adjacent the gripping means, a knotter head to engage the string between the gripping means and the spring holding clip, a contact finger in advance of the knotter head to engage the string of a formed loop to insure that it is seated in the holding clip prior to engagement of the string with the knotter head, the rounded end of the loop being yieldingly supported by the carrier head to hold the formed loop in taut condition.

24. In a tag stripping machine, means for cutting off and forming a measured loop from a continuous supply of string, a supporting carrier for formed loops comprising a gripper for the ends and a resilient head for engaging the rounded loop, means for moving the carrier intermittently, a knotter head engaged by the formed loop in the carrier, means for operating the knotter head to form a knot in the ends of a formed loop and drawing the loop supporting head yieldingly toward the knotter head, and means for pulling the rounded end of a loop through a tag to be strung.

25. In a tag stringing machine, means for cutting off and forming a measured loop from a continuous supply of string, a step by step carrier for the formed loop, a knotter for forming a knot in the ends of each string loop, means for feeding a perforated tag below the rounded end of a loop and means for drawing the rounded end of a loop through the eye of a tag and pulling the knotted end of the loop through the rounded end thereof.

26. In a tag stringing machine, means for cutting off and forming a measured loop from a continuous supply of string, means for forming a knot in the adjacent ends of each string loop, a carrier comprising a head with a forked end for supporting the rounded end of a loop, means for feeding a tag with its eye under the forked end of the head and means for drawing the string through the eye of a tag, comprising a needle inserted from below through the eye of the tag and engaging the string.

27. In a tag stringing machine, the combination with means for cutting off and forming a measured loop from a continuous supply of string, of a knotter for forming a knot in the ends of each string loop, a hopper for containing a supply of tags, means for engaging the lowest tag in the hopper and feeding it with its eye in position below the rounded end of a formed loop, a hook insertable from below through the eye of the tag to draw the rounded string end downwardly therethrough, means for spreading the rounded end of the loop and means for engaging the knotted end and drawing it downwardly through the spread portion of the loop.

28. In a tag stringing machine, the combination with means for cutting off and forming a measured loop from a continuous supply of string, of a knotter for forming a knot in the ends of the string loop, a carrier having a forked head for supporting the rounded end of the formed loop, means for feeding a tag from the bottom of a supply hopper so that its eye registers with the rounded end of the formed loop, means for feeding the rounded end of the loop through the eye of a tag, a spreader for engaging the rounded end of the loop fed through a tag, and hook means insertable through the spread loop to engage the string intermediate its end and draw the knotted end through the spread portion of the loop.

29. In a tag stringing machine, the combination with means for cutting off and forming a loop from a continuous supply of string, of means for feeding tags from the bottom of a supply hopper to position the eye thereof under the rounded end of a formed loop, means for carrying the formed loops in a step by step movement, a knotter for forming a knot in the ends of each loop, means for drawing the rounded end of the loop through the eyelet of a tag and spreading the rounded end and then drawing the knotted end of the loop therethrough and means for discharging a strung tag from the carrying means.

30. In a tag stringing machine, the combination with means for cutting off and forming a loop from a continuous supply of string, of a carrier for supporting formed loops in a step by step movement, means for knotting the ends of each string loop, means for feeding the tags to the carrier from a source of supply, a yielding clip for holding each tag in position on the carrier, means for stringing the rounded end of the loop through the eye of a tag, means for drawing the knotted end of the loop through the rounded end, means for disengaging the loop from the supporting carrier, and means for then disengaging the tag from the clip in discharging it from the carrier.

31. In a tag stringing machine, the combination with means for cutting off and forming a loop from a continuous supply of string, of a knotter for the ends of the string loops, means for feeding tags to be strung, a carrier for the string loops to which the tags are fed, a hook for drawing the rounded end of a string loop through the eye of a tag, means for spreading the rounded end of a loop which is drawn through the tag and a gripping hook inserted through the spread end of a string loop adapted to engage the string intermediate the ends of the loop and to draw the knotted end through the loop and tighten the rounded end of the loop about the end of the tag.

32. In a tag stringing machine, the combination with means for forming measured loops from a continuous supply of string, of means for severing the string loops, a knotter for the ends of the loops, an intermittently actuated carrier drum for the loops, means for feeding tags to the carrier drum, means for hooking the rounded end of a string loop through the tag on the carrier in the knotting position, an engaging hook mounted on the carrier drum and movable through the loop as the drum is moved to engage the string of the loop intermediate its ends for pulling the knotted end through the loop and tightening it about the tag.

33. In a tag stringing machine, the combination of means for forming a loop from a continuous supply of string, of means for severing the string loop, a knotter for the ends of the string loop, a carrier drum for intermittently moving formed loops to the knotter, means for feeding tags to the drum, means carried by the drum for pulling the rounded end of each loop through a tag, other means for then spreading the loop and separate means for drawing the knotted end of the loop through the spread end and means in connection with the carrier drum for maintaining the string loop in taut condition until the rounded end is pulled through a tag.

34. In a tag stringing machine, a carrier drum, means for carrying formed loops of string on the drum, means for feeding tags to be carried by the drum, a number of plates on the drum for receiving the tags, means for holding the tags on the plates, means carried by the drum for stringing the loops through the tags as the drum is moved and then disengaging the string from the drum, and means for engaging the strung tags and disengaging them from the holding means for discharging the strung tags from the drum.

35. In a tag stringing machine, a carrier drum having a plurality of tag receiving plates with transverse grooves therein, a spring clip between the grooves for holding a tag on each plate as the drum rotates and means for withdrawing a tag from the drum comprising carrier fingers engaging in the grooves and with the tag and movable with the tag away from the drum.

36. In a tag stringing machine, a carrier drum, a continuous drive, means for intermittently operating the drum from the drive, means for cutting off and forming a measured loop from a continuous supply of string, supports on the drum for gripping the ends of formed loops and loosely engaging the rounded ends thereof, means for forming a knot in the ends of each loop, means for feeding tags to the carrier drum, means for hooking the rounded end of a loop through the eye of a tag, spreading the loop, and drawing the knotted end of the string through the spread loop, and means for disengaging the strung tags from the carrier drum and discharging them away from the machine intermittently as the carrier drum is actuated.

AXEL R. SCHOLIN.